Aug. 13, 1968     C. B. KREKELER     3,397,012
CUTTER BITS AND MEANS FOR MOUNTING THEM
Filed Dec. 19, 1966     5 Sheets-Sheet 1
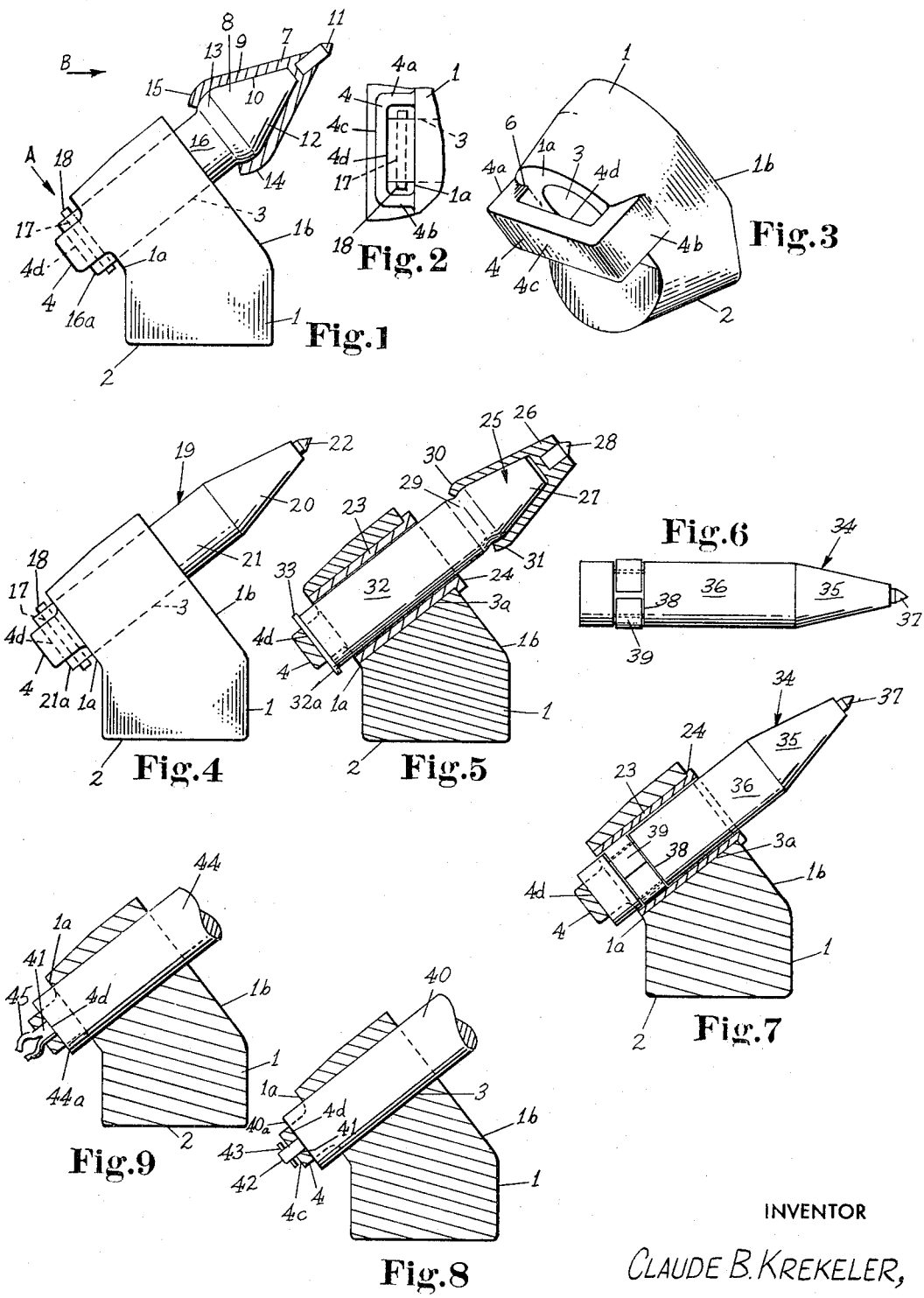
INVENTOR
CLAUDE B. KREKELER,
BY Yungblut, Melville, Strasser and Foster
ATTORNEYS Aug. 13, 1968  C. B. KREKELER  3,397,012
CUTTER BITS AND MEANS FOR MOUNTING THEM
Filed Dec. 19, 1966  5 Sheets-Sheet 2
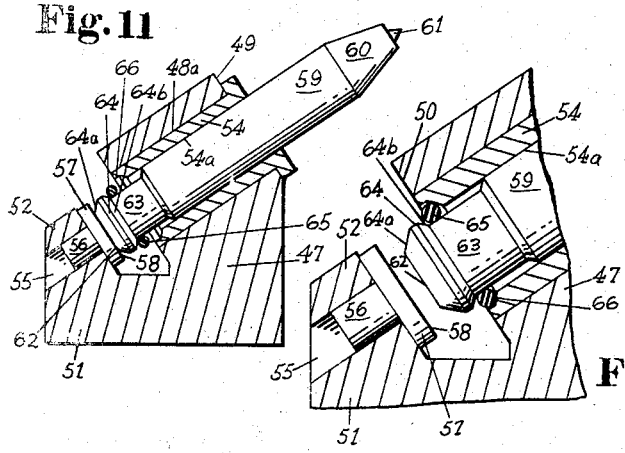
Fig. 11
Fig. 12
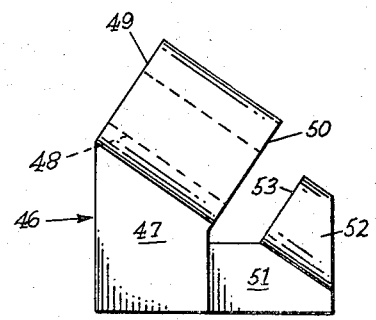
Fig. 10
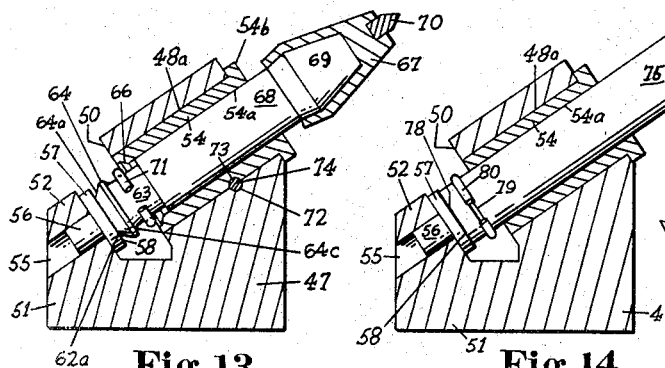
Fig. 13
Fig. 14
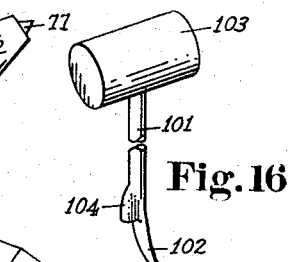
Fig. 16
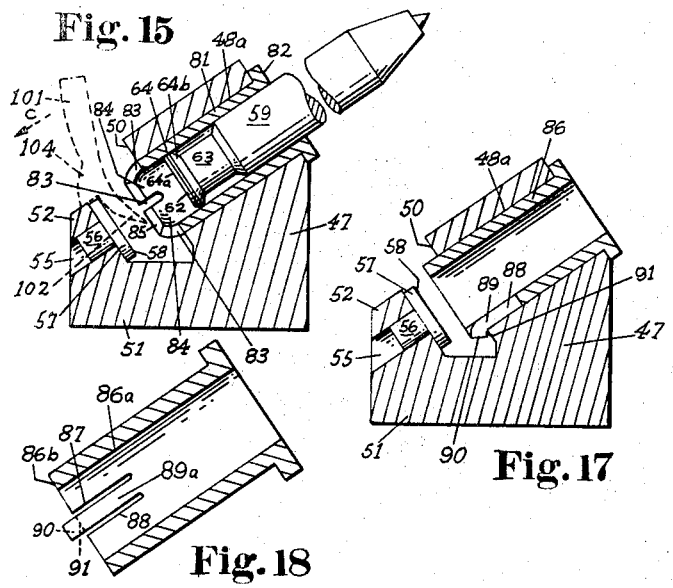
Fig. 15
Fig. 17
Fig. 18
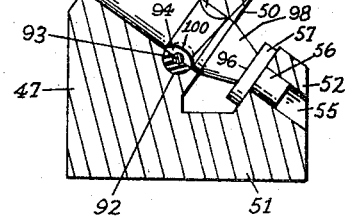
Fig. 19
INVENTOR
CLAUDE B. KREKELER,
BY Yungblut, Melville, Strasser and Foster
ATTORNEYS Aug. 13, 1968  C. B. KREKELER  3,397,012
CUTTER BITS AND MEANS FOR MOUNTING THEM
Filed Dec. 19, 1966  5 Sheets-Sheet 3
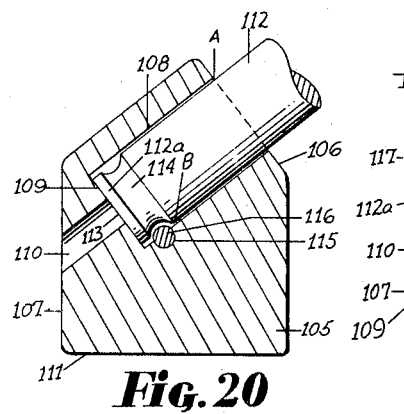
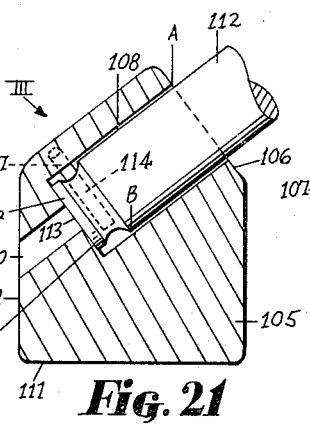
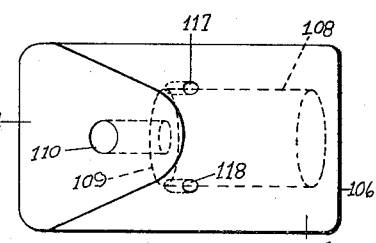
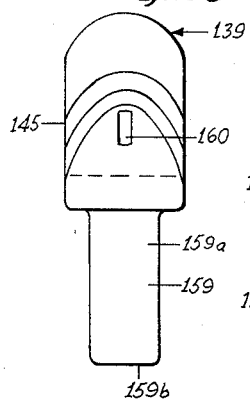
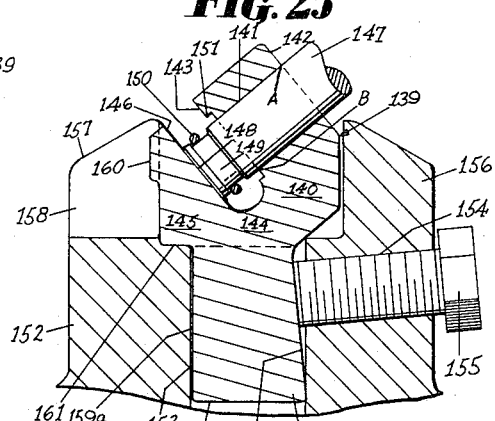
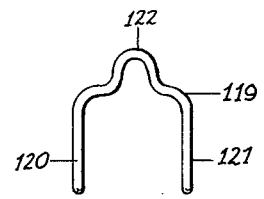
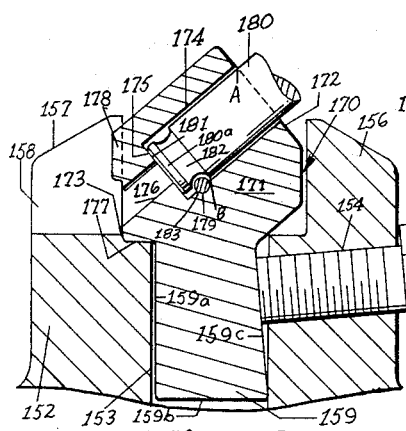
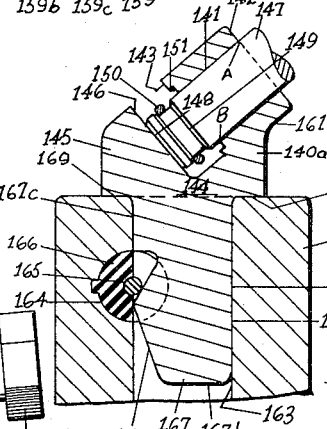
INVENTOR
CLAUDE B. KREKELER,
BY Yungblut, Melville, Strasser and Foster
ATTORNEYS

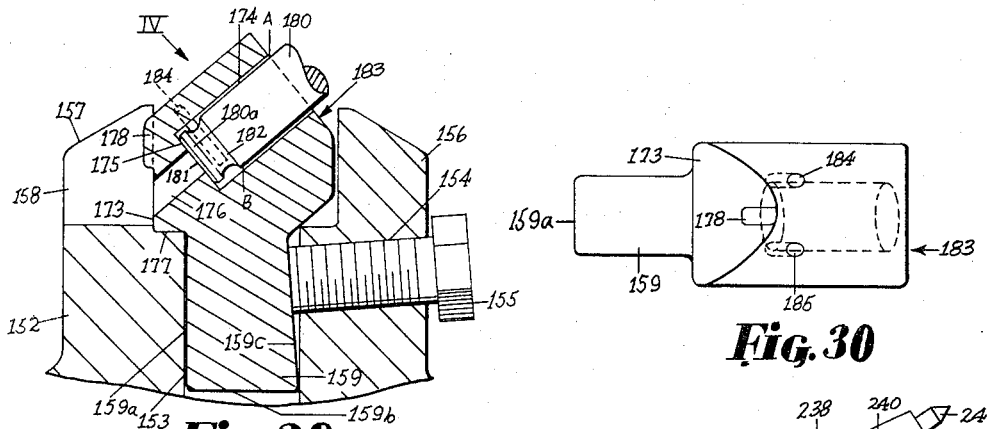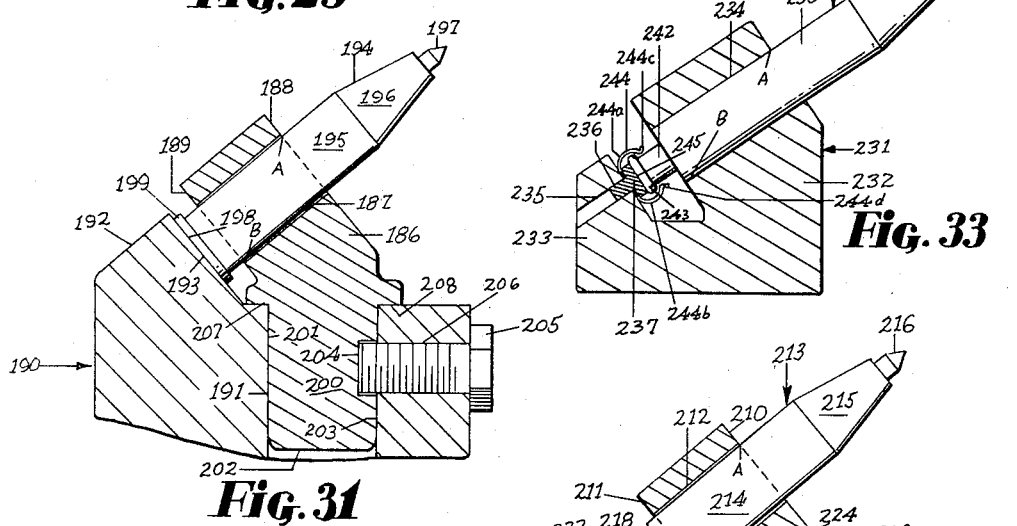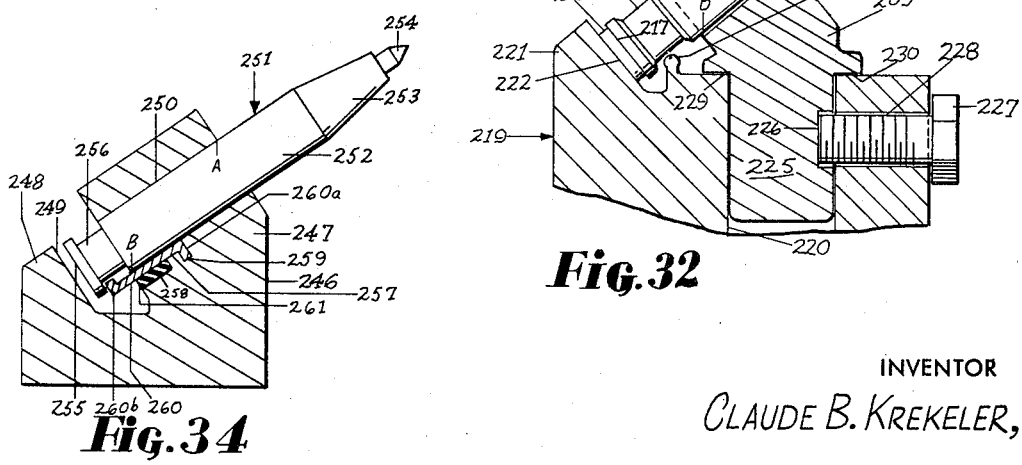

Aug. 13, 1968  C. B. KREKELER  3,397,012
CUTTER BITS AND MEANS FOR MOUNTING THEM
Filed Dec. 19, 1966  5 Sheets-Sheet 5

INVENTOR
CLAUDE B. KREKELER,
BY Yungblut, Melville, Strasser and Foster
ATTORNEYS

3,397,012
CUTTER BITS AND MEANS FOR MOUNTING THEM
Claude B. Krekeler, Hamilton County, Ohio, assignor to The Cincinnati Mine Machinery Co., Cincinnati, Ohio, a corporation of Ohio
Continuation-in-part of application Ser. No. 537,158, Mar. 24, 1966. This application Dec. 19, 1966, Ser. No. 611,513
57 Claims. (Cl. 299—86)

ABSTRACT OF THE DISCLOSURE

A cutting tool and mounting means for use on a mining machine and the like. The cutting tool comprises an elongated shank with circular cross section, a cutting means at one end of the shank and a gauge-determining abutment means at the other end of the shank. The mounting means comprises a body having a shank receiving perforation, the perforation having a forward end a rearward end and being of a diameter such that the shank of the cutting tool is freely rotatable therein. An abutment surface is provided in association with the rearward end of the shank receiving perforation, the abutment surface on the mounting means being adapted to cooperate with the abutment surface on the cutting tool.

---

This application is a continuation-in-part of the case in the name of the same inventor, Ser. No. 537,158, filed Mar. 24, 1966, now abandoned, and entitled Cutter Bits and Means for Mounting Them.

This application is also related to the copending cases of the same inventor: Ser. No. 432,981, filed Feb. 16, 1965, now Patent No. 3,342,531, and entitled Cutter Bits of Heavy Construction and Means for Mounting Them; Ser. No. 439,586, filed Mar. 15, 1965, now Patent No. 3,342,532, and entitled Cutting Structures for Mining Machines; and Ser. No. 454,002, filed May 7, 1965, now Patent No. 3,331,637, and entitled Cutter Bits and Mounting Means Therefor.

This case pertains to improved cutter bit means for mining machinery and the like, and improved means for mounting the cutter bit means in cutting positions and for driving them against the face of a seam of coal or other mineral to be mined. More especially this case relates to cutter bits of the type having a conical or tapering exterior configuration and which may have a piece of hard cutting alloy mounted at the tip of the bit. Such conical cutter bits may be of two general types. In one type the conical cutter bit has an integral shank adapted to be received in a socket member or bit holder of a mining machine. In this type of bit the conical portion may simply taper to a cutting point, or a tip of hard cutting alloy may be affixed to the conical portion. In some instances the entire cutter bit may be made of hard cutting alloy, with or without a separate hard cutting tip. The other type comprises a conical bit element adapted to cooperate with an adapter, which in turn has a head and a shank portion configured to be received in a bit holder or a socket member. In one form, the bit may comprise a hollow conical member with or without a tip of hard cutting alloy. The head portion of the adapter is configured to be received within the hollow cutter bit. In another form, the conical cutter bit may have a shank configured to be received in a perforation in the adapter, as taught in the above identified application Ser. No. 439,586. There has recently been considerable interest in the mining industry in bits of these general types, especially for heavy duty application where the bits have a greater service life and effect a better usage of the hard alloy tips.

The service life of such bits, moreover, is prolonged if provision is made for the slow automatic rotation or rocking of such bits about their main axis, the movement referred to being a movement generated by the mutual reaction of the bit itself and the mineral being cut.

This case also relates to improvements in mounting means for the cutter bits or cutter bit adapters. In one form the mounting means of the present invention comprises holders with integral shanks adapted to be received in the shank receiving perforations of conventional socket members. In another form, the mounting means of the present invention themselves comprise lugs or socket members for mining machines. The lugs or socket members to be described may be installed upon chains, wheels or cutter arms of mining machinery (usually by welding them to the driven elements which carry them) and they may be oriented at different angularities to the driven elements so that the cutting points of the various bits will form a cut of sufficient width to permit the passage of the driven element to the extent desired. Often, even the lugs of the center cutting bits may be oriented at a slight lateral angle to the direction of motion of the bit so as to increase the natural tendency of the bit to rotate during the cutting operation.

Socket members or bit holders of the type to be described are generally provided with perforations for the receipt of the shank of a cutter bit or a cutter bit adapter in such a way that the cutter bit tip will lie above the highest part of the socket member or bit holder, and the axis of the cutter bit will lie at an angle of less than 90° to the direction of motion of the bit in the cutting operation so that the cutting stresses will be sustained more nearly in line with the cutter bit axis.

The shank of the cutter bit or adapter will be of a diameter slightly less than the diameter of the socket member or bit holder perforation so that the shank will be freely rotatable therein.

In connection with bits of the type described above, means have to be provided for determining the gauge of the bits, i.e. the depth to which the shanks of the cutter bits or the cutter bit adapters will enter the perforation in the bit holder or socket member. Heretofore forward abutment means were provided on the shanks of the cutter bits or the cutter bit adapters which would contact the socket member at or adjacent its forward face. Often a forward abutment means took the form of an annular shoulder on the shank of the cutter bit or adapter. In some instances an annular shoulder would be provided with a tapering underside for engagement in a corresponding countersink at the forward end of the shank receiving perforation in the lug member.

It will be understood by one skilled in the art that cutter bits or cutter bit assemblies of the type described when used on heavy duty mining machines operating continuously during the mining operation, are subjected to heavier and more continuous strains. The provision of the above mentioned forward abutment means necessitated an abrupt change in diameter of the cutter bit shank or the cutter bit adapter shank at the juncture between that portion of the shank lying within the shank receiving perforation and that portion lying outside the lug.

It has been found that such changes of diameter in a shank constitute stress-raisers tending to concentrate the cutting strains, and a shank will tend to fail at the position of a stress-raiser. This is true whether the changes in diameter are toward a lesser or greater diameter. It has further been found that it is particularly undesirable to have stress-raising changes in diameter in that portion of a shank which may be termed the "critical zone." Since the diameter of the shank is slightly less than the diameter of the holding means perforation (so that the shank is freely rotatable therein), there will be a forwardmost and a rearwardmost area of contact between the lateral exterior surface of the shank and the corresponding interior surface of the holding means perforation. The critical zone of the shank comprises that portion thereof extending substantially from the above mentioned rearwardmost area of contact to a point beyond and in the immediate vicinity of the above mentioned forwardmost area of contact.

Furthermore, the necessity of providing abutment means in association with the shank of a cutter bit or cutter bit adapter rendered the cutter bit or adapter less easy and more expensive to manufacture.

It is therefore a primary object of the present invention to provide a cutter bit or cutter bit adapter having a shank portion with a substantially constant diameter throughout its length, the shank portion being free of stress-raising diameter changes particularly in the critical zone.

It is an object of the present invention to provide a cutter bit or cutter bit adapter having a shank portion of substantially constant diameter whereby the shank diameter may be substantially reduced and yet display the same or greater strength as conventional cutter bit shanks of heavier construction and having one or more drastic changes in diameter.

It is an object of the present invention, in certain embodiments, to provide novel retaining means to prevent removal of the shank of the cutter bit or cutter bit adapter from the shank receiving perforation of the mounting means.

It is an object of the present invention to provide a lug or socket member having means against which the end of a shank of a cutter bit or cutter bit adapted may bottom, the shank being freely rotatable within the socket member perforation.

It is an object of the present invention to provide a holding means for a cutter bit shank or adapter shank having means against which the shank end may bottom, the shank being freely rotatable within the perforation of the holding means, the holding means itself having a shank adapted to be received within the perforation of a conventional socket member.

These and other objects of the invention which will be set forth hereinafter or will be apparent to one skilled in the art upon reading these specifications are accomplished by that construction and arrangement of parts of which certain exemplary embodiments will now be described. Reference is made to the drawings wherein:

FIG. 1 is a view partly in elevation and partly in section of a structure made in accordance with the present invention comprising a lug, a bit adapter and a conical bit.

FIG. 2 is a fragmentary view of the end of the lug as viewed in the direction of the arrow I in FIG. 1.

FIG. 3 is a perspective view of a lug or socket member.

FIG. 4 is an elevational view of a structure made in accordance with the present invention and comprising a lug and a conical bit having an integral shank.

FIG. 5 is a view partly in elevation and partly in section showing a lug and a bit and bit adapter and showing novel means for retaining the bit adapter within the lug perforation.

FIG. 6 is an elevational view of a cutter bit having an integral shank and novel retaining means in association therewith.

FIG. 7 is a cross sectional elevational view of the lug member of the present invention showing the cutter bit of FIG. 6 located therein.

FIG. 8 is a view partly in elevation and partly in section of a structure made in accordance with the present invention and illustrating another form of shank retaining means.

FIG. 9 is a view partly in elevation and partly in section of a structure made in accordance with the present invention and illustrating yet another form of shank retaining means.

FIG. 10 is a side elevation of another embodiment of the lug of the present invention.

FIG. 11 is a view partly in elevation and partly in section of a structure made in accordance with the present invention and comprising a lug similar to the type shown in FIG. 10 and a cutter bit.

FIG. 12 is a fragmentary view partly in cross section illustrating the action of the cutter bit retaining means of FIG. 11.

FIG. 13 is a view partly in elevation and partly in section showing another form of cutter bit retaining means.

FIG. 14 is a view partly in elevation and partly in cross section showing another form of bit retaining means.

FIG. 15 is a view partly in elevation and partly in cross section of a lug, a cutter bit and a cutter bit retaining means of the present invention.

FIG. 16 is a perspective view of a tool for removing the cutter bit from a lug.

FIG. 17 is a view partly in elevation and partly in cross section of a lug and a sleeve member illustrating novel means for retaining the sleeve member in the lug perforation.

FIG. 18 is a cross sectional view of a sleeve showing means in connection therewith for locking the sleeve in a lug perforation.

FIG. 19 is a view partly in elevation and partly in cross section showing another form of bit retaining means.

FIG. 20 is a fragmentary view partly in elevation and partly in cross section of another form of lug or socket member of the present invention showing the shank of a cutter bit or adapter located therein and held by retaining means.

FIG. 21 is a view similar to FIG. 20 illustrating another form of retaining means.

FIG. 22 illustrates the top of the socket member as viewed in the direction of arrow III in FIG. 21.

FIG. 23 is an elevational view of a retaining means for use with the bit adapter of FIGS. 21 and 22.

FIG. 24 is an elevational view of a bit adapter of the present invention adapted to be mounted in a conventional socket member.

FIG. 25 is a view partly in elevation and partly in section of another cutter bit adapter of the present invention mounted in a conventional socket member and provided with a cutter bit.

FIG. 26 is a rear end elevation of the adapter of FIG. 25.

FIG. 27 is a view partly in elevation and partly in section of a bit adapter of the present invention provided with a bit and mounted in a conventional socket member of the type utilizing a resilient retaining means for the bit adapter shank.

FIG. 28 is a view partly in elevation and partly in section of a modified bit adapter including a cutter bit and mounted in a conventional socket member of the type shown in FIG. 25.

FIG. 29 is a view partly in elevation and partly in section of another form of bit adapter with a bit located therein and mounted in a conventional socket member of the type shown in FIG. 25.

FIG. 30 illustrates the top of the bit adapter as viewed in the direction of the arrow IV in FIG. 29.

FIG. 31 is a view partly in elevation and partly in section of a modified bit adapter and bit of the present invention mounted in a socket member and illustrating another form of retaining means.

FIG. 32 is a view partly in elevation and partly in section of a bit, bit adapter and socket member assembly similar to that of FIG. 31 but showing another form of retaining means.

FIGS. 33 through 36 are views partly in elevation and partly in section of cutter bits held in lug members similar to that shown in FIG. 10 by various forms of retaining means.

FIG. 37 is a perspective view of a tool for use in removing the cutter bit from the lug member of FIG. 36.

Figure 35:
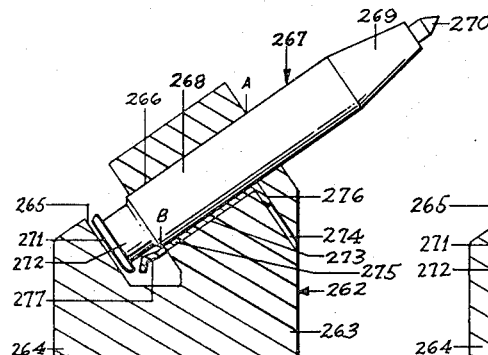

Briefly, the present invention contemplates the use of a mounting means for a cutter bit or a cutter bit and adapter having a perforation adapted to receive the shank of a cutter bit or adapter. The mounting means may itself be a lug or socket member, or it may be a bit adapter means with a shank to be received in the perforation of a socket member. In the latter instance the socket member itself may be conventional. An abutment surface is provided in association with the mounting means extending transverse the axis of the shank receiving perforation. The shank receiving perforation in the lug or socket member or bit adapter may be a simple cylindrical bore and the shank of the cutter bit or cutter bit adapter may also be of cylindrical configuration having substantially the same diameter throughout its length. The rearward end of the shank will contact the abutment surface which serves as a gauge determining means for the shank. Means may also be provided for preventing the shank from being removed from the socket member or bit adapter perforation.

Referring to FIG. 1, one form of a lug or socket member of the present invention is shown at 1. The lug has a base 2 by which it may be attached or welded to a cutting wheel, a cutting head, a cutting arm, the links of a cutting chain, or any other means by which the bit may be moved under power in the cutting direction. While a separate lug or socket member has been shown, it does not constitute a departure from the spirit of the invention to provide such a lug as an integral part of a cutting wheel, cutting head, cutting arm or the like.

The lug has a perforation 3 to receive the shank of a bit adapter or cutter bit. Assuming that the lug is driven in the direction indicated by the arrow II, the axis of the perforation 3 will lie at an angle to the direction of movement. This angle will be less than 90° and of such magnitude that the tip of the bit will lie above the highest part of the lug 1. It will be understood by one skilled in the art that the smaller this angle is the more nearly the cutting strains will be sustained along the axis of the cutter bit.

The rear face 1a of the lug 1 is provided with a strap 4. The strap 4 is more clearly shown in FIGS. 2 and 3 wherein like parts have been given like index numerals. The strap 4 is generally U-shaped, the legs 4a and 4b of the U-shaped configuration extending rearwardly of the surface 1a, and the base 4c of the U-shaped strap extending across the rear opening of the perforation 3. The base portion 4c of the strap is parallel to the rear face 1a of the lug and presents an abutment surface 4d which is spaced from the rear opening of the perforation 3 and intersects the axis of this perforation perpendicularly. In FIG. 1, the strap 4 is illustrated as an integral part of the lug or socket member 1. In FIG. 2, the U-shaped strap 4 is shown as welded to the rear face 1a of the lug as at 5. In FIG. 3, the strap is shown as welded to the rear face 1a and the sides of the lug as at 6.

In FIG. 1, the lug 1 is illustrated as provided with a cutter bit of the type comprising a conical bit 7 and a bit adapter 8. As described in the above mentioned application Ser. No. 454,002, the bit itself may be made by forging, by upsetting, by a turning operation, as a screw machine product, by powdered metallurgy and in other ways not constituting a limitation here. It has a generally tapering outer body surface as indicated at 9 and a conical inner surface 10. The bit itself may be provided with a tip 11 of hard cutting alloy.

The bit 9 may have a frictional engagement with the conical portion 12 of the bit adapter 8. So long as the sloping faces of the interior hollow 10 of the bit and of the outwardly tapering nose portion 12 of the bit adapter correspond, have a correct angularity, and are correctly proportioned, the bit can be retained frictionally on the bit adapter in such a way that it will resist the stresses encountered in cutting or "bursting" the mineral, such as coal being mined. Normally also there will be little chance of the bit 7 being dislodged from the bit adapter accidentally, as by centrifugal force, under such frictional conditions. Nevertheless, there are circumstances including a reverse travel of the lug member which might tend to subject the bit itself to extraordinary forces perhaps accompanied by impact. As a consequence it is desired to provide some more positive engagement between the bit and bit adapter nose. As described in the last mentioned application, this may be accomplished by providing a portion 13 of the bit adapter with a taper opposite to the taper of the portion 12. The lower portion of the skirt of the bit 7 may be distorted at one or more places (as indicated at 14 and 15). This distortion will be such that the diameter of the bit skirt after the detent or detents 14 and 15 will be slightly less than the diameter of the line of juncture between the reversed conical portions 12 and 13 of the bit adapter nose. The end of the bit skirt will be required to be expanded in order to pass over this line of juncture. This is most conveniently accomplished by placing the bit over the conical portion 12 of the bit adapter and driving the bit home by a hammer blow on the end of the bit nose, exerted through the use of a tool having an operating face softer than the substance of the hard cutting tip 11. The driving portion of the tool may be faced, for example, with babbitt, brass, bronze or the like. Since the distortion of the lower end of the bit skirt is a resilient distortion, the detents 14 and 15 having passed the aforesaid line of juncture will reform below it, and will cause a section or sections of the bit skirt to contract against the tapered section 13 of the bit adapter. It will be understood by one skilled in the art that for purposes of clarity the taper of the portion 13 of the bit adapter and the distortion of the detents 14 and 15 have been illustrated in exaggerated fashion.

It is also within the scope of the invention to provide a bit of the type shown in FIG. 1 which may be made rotatable with respect to the bit adapter nose. In this instance the conical surface of the portion 12 of the bit adapter and the conical inner surface 10 of the bit need not conform, but on the contrary may be relatively rough forged surfaces. The engagement of the detents 14 and 15 on the tapered portion 13 of the bit adapter may be a relatively loose engagement, and yet may be sufficient to prevent loss of the bit. It will be understood by one skilled in the art that the type and configuration of the bit applied to the bit adapter 8 does not constitute a limitation on the present invention; the bit 7 may be rotatable or non-rotatable with respect to the nose portion of the adapter 8. The nose portion of the adapter 8 may be of any suitable configuration and may be provided with any suitable bit structure, as described in the above mentioned applications.

The adapter 8 has an elongated cylindrical shank 16. The shank 16 will be of substantially constant diameter throughout its length and is adapted to be received in the perforation 3 in the lug 1. The end 16a of the shank is adapted to abut the surface 4d of the strap 4 for gauge determining purposes. Retaining means will be provided in association with the end 16a of the shank for preventing accidental removal of the shank from the perforation 3. In FIG. 1 that portion of the shank 16 adjacent the end 16a and which protrudes from the rear opening of the perforation 3 is shown as provided with a transverse hole 17. A pin member 18 is tightly engaged in the hole 17 and extends beyond the shank at at least one end. The use of what is known as a "roll pin" constitutes a satisfactory and inexpensive expedient. As known in the art, a roll pin consists of a piece of resilient sheet metal rolled in such a way as to have a slightly larger diameter than the hole into which it is driven. The roll pin will contract to permit driving into the hole 17, and the resiliency of the metal of the roll pin will be such as to cause it to retain its position therein. The end or ends of the roll pin which extend beyond the shank 16 will abut the rear surface 1a of the lug 1 and prevent removal of the shank from the perforation 3.

In the structure of FIG. 1, the shank 16 should have a reasonably accurate fit within the perforation 3 in the lug member; but it is not necessary that the fit be tight or frictional in characteristics. Thus, the entire bit adapter will be free to turn or rotate with respect to the lug 1 under the forces encountered in cutting. This is true irrespective of whether the bit 7 is of the type which will rotate with respect to the adapter or which will be frictionally held on the adapter. As will be noted in FIG. 2, the length of the roll pin 18 will be less than the distance between the legs 4a and 4b of the U-shaped strap 4. Thus, the roll pin will not contact the strap and will not prevent the free rotation of the shank 16.

In the particular embodiment shown in FIG. 1, when it becomes necessary to remove a worn bit from the bit adapter, this may be easily accomplished by engaging a prying tool between the skirt of the bit and the forward surface 1b of the lug. The detents 14 and 15 of the bit re-expand so as to pass the line of juncture between the oppositely tapered portions 12 and 13 of the adapter nose. When it becomes necessary to remove the bit adapter from the lug 1, this may be easliy accomplished by knocking out the roll pin 18 from the perforation 17. Should the shank of the adapter have become tightly engaged in the perforation 3, due to the accumulation of fines, the action of corrosive mine waters or the like, a blow may be administered to that portion of the end 16a of the shank not covered by the strap 4, by means of any suitable tool.

In FIG. 4, like parts have been given like index numerals. In FIG. 4 the lug is similar to that shown in FIG. 1. In this instance, however, the lug is shown as provided with a cutter bit (generally indicated at 19) of the type having a conical nose portion 20, and an integral shank 21. Again, the conical nose portion may be provided with a hard cutting tip 22. The shank 22 is similar to the shank 16 in FIG. 1, and is so dimensioned as to be freely rotatable within the perforation 3. The end 21a of the shank is adapted to bottom against or abut the surface 4d of the strap 4 and is provided with a transverse perforation 17 and roll pin 18. In this particular construction it will be understood by one skilled in the art that the configuration of the bit and integral shank have been vastly simplifield. The shank 21 is completely free of stress-raising diameter changes. Such a cutter bit is characterized by strength, long life, and may be easily and inexpensively manufactured. The removal of the bit 19 from the lug 1 may be accomplished in the same manner as described above with respect to the removal of the shank 16 in FIG. 1.

FIG. 5 shows another embodiment of the present invention including another form of retaining means. In this embodiment the lug may be the same as that shown in FIGS. 1 through 4 (and like parts have been given like index numerals) except that the shank receiving perforation, designated at 3a, is of an enlarged diameter. In this embodiment the enlarged perforation 3a is provided with a removable cylindrical sleeve or liner 23. The liner 23 is provided with an annular flange 24 at its forward end. The annular flange serves as a gauge determining means for the sleeve, abutting the forward face 1b of the lug and preventing the sleeve from extending beyond the rear face 1a of the lug.

In the particular embodiment illustrated in FIG. 5, the cutter bit comprises a cutter bit adapter 25 and a bit 26. The cutter bit adapter is provided with a head portion comprising a tapering conical nose 27 and a shallow V-notch 29. The cutter bit 26, similar to the bit shown at 7 in FIG. 1, is provided with conical interior and exterior surfaces and a hard cutting alloy tip 28. The shallow V-notch 29 is engaged by detent portions 30 and 31 on the skirt of the bit 26. Again, the bit 26 may be rotatable with respect to the bit adapter or non-rotatable as described above. Again, the configuration of the nose of the bit adapter 25 and the configuration of the bit 26 do not constitute limitations on the present invention and may be of any suitable type illustrated in the above mentioned applications.

The bit adapter 25 is provided with an elongated cylindrical shank 32 having a substantially constant diameter throughtout its length. The diameter of the shank 32 and the internal diameter of the sleeve 23 are so dimensioned that there is just enough clearance between the two elements to permit free rotation of the shank 32 in the sleeve. The rearward end 32 of the shank is again adapted to abut or bottom on the surface 4d of the strap 4, thereby determining the gauge of the shank.

The liner or sleeve 23 serves two purposes. First, it serves as a retaining means for the shank 32, preventing it from being accidentally withdrawn from the sleeve. The rearwardmost end of the shank 32 is provided with an annular flange 33 having a diameter larger than the interior diameter of the sleeve 23, and smaller than the interior diameter of the perforation 3a. Thus removal of the shank 32 from the sleeve 23 will be prevented by the flange 33.

It will be noted that assembly of the structure illustrated in FIG. 5 requires that the bit adapter 25 be placed in the sleeve 23 first. The sleeve 23 is then forced into the perforation 3a in the lug 1. The exterior of the liner 23 is such that it will have a press fit in the perforation 3a, or it may be held in place by a pin extending transversely of the lug as will be described hereinafter. The bit 26 may be applied to the nose of the bit adapter before or after insertion of the liner 23.

It will be obvious to one skilled in the art that removal of the bit 26 may once again be accomplished by insertion of a proper prying tool between the skirt of the bit and the flange 24 of the sleeve or the surface 1b of the lug. Removal of the bit adapter 25 may be accomplished by applying a series of blows or a prying force to its end 32a. This, in turn, will shove the sleeve 23 forward and a prying tool or drift may then be inserted between the flange 24 and the face 1b of the lug.

The second purpose served by the sleeve 23 relates to the protection of the lug perforation 3a. It will be understood by one skilled in the art that in those embodiments of the present invention wherein no sleeve 23 is used, the lug or socket member perforation will be subjected to a certain amount of wear. This is particularly true since the shank of the cutter bit or cutter bit adapter is configured to rotate in the perforation. When, over a period of time, the perforation in the lug or socket member becomes excessively worn and the shank therein become loose, the lug must be replaced. In the embodiment illustrated in FIG. 5, the sleeve 23 may be made of any suitable durable material such as medium carbon alloys or the like, and any wear caused by the shank 32 and its rotation will be imparted to the sleeve rather than to the lug perforation 3a. It will be understood that the sleeve 23 may be more easily and inexpensively replaced than the lug 1.

While FIG. 5 illustrates the use of cutter bits of the type comprising a bit adapter and a bit, it will be understood that a bit of the type illustrated in FIG. 4 may be used so long as it is provided with an annular flange similar to the flange 33 in FIG. 5.

FIG. 6 illustrates another form of shank retaining means for use with the lug and sleeve assembly of FIG. 5. The bit (generally indicated at 34) is shown as having a conical nose 35 and an integral cylindrical shank 36 similar to the bit illustrated in FIG. 4. Again, the bit may be provided with a hard cutting tip 37. It will be understood by one skilled in the art that while the bits shown in FIGS. 6 and 7 are of the type having an integral shank, the structure shown in these figures may be equally well applied to cutter bits comprising bits and bit adapters. As indicated in FIG. 6, the shank 36 of the bit is provided with an annular groove 38. Located within the groove 38 is a split ring 39 of resilient material such as resilient metal or the like. The ring 39 has an external diameter greater than the external diameter of the shank 36 and an internal diameter less than the external diameter of the shank so that, once the ring 39 is placed in the groove 38, it is captive therein.

FIG. 7 illustrates the bit of FIG. 6 in place in a lug. The lug and sleeve assembly of FIG. 7 is identical to that illustrated in FIG. 5, and like parts have been given like index numerals. In this instance the ring 39 has an external diameter slightly greater than the internal diameter of the sleeve 23. Therefore, when the cutter bit is inserted in the sleeve (by means of a series of blows with an appropriate tool) and is caused to bottom or abut the surface 4d of the strap 4, the split ring 39 will be caused to contract. The ring will frictionally engage the interior surface of the sleeve 23 preventing accidental removal of the cutter bit from the sleeve. The external diameter of that portion of the shank 36 forming the notch 38 and the internal diameter of the ring 39 in contracted position are such that the shank 36 is free to rotate in the ring even when the ring is contracted. Thus the interaction of the ring 39 and the sleeve 23 serves as a retaining means for the shank 36, while still permitting rotation of the shank during the cutting operation.

Figure 40:
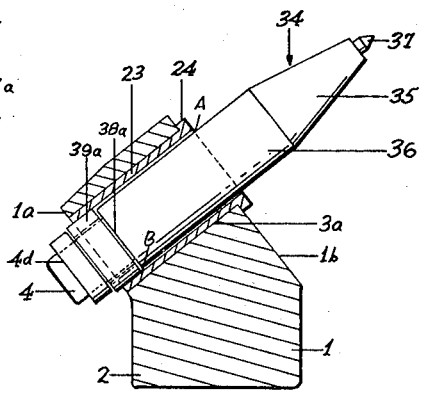
FIG. 40 illustrates an assembly similar to that of FIG. 7 with a slightly modified cutter bit having no stress-raising changes in diameter within the critical zone.

FIG. 40 illustrates the assembly of FIG. 7 with a slight modification. Like parts have been given like index numerals. In this preferred construction, the notch 38a has been so located on the shank 36 that the rear edge of the ring 39a will be flush with or extend slightly beyond the rear surface 1a of the lug or socket member 1. Thus, although the notch 38a is substantially wholly within the sleeve 23, the forwardmost contact point between the shank 36 and the sleeve is at A and the rearwardmost contact point is at B, when the bit is moving in the cutting direction. For this reason the critical zone A–B of the shank is free of stress-raising diameter changes.

FIG. 8 illustrates yet another form of retaining means. Again, the lug or socket member is similar to that shown in FIGS. 1, 2 and 3 and like parts have been given like index numerals. The shank 40 may be the shank of a cutter bit or a cutter bit adapter and is cylindrical in configuration, having substantially a constant diameter throughout its length. In this embodiment the base 4c of the strap 4 is provided with a perforation 41. The perforation 41 will be substantially coaxial with the perforation 3 and the axis of the shank 40. The end 40a of the shank is adapted to bottom or abut the surface 4d of the strap, and is provided with a centrally located rod-like extension 42. The rod-like extension may be suitably affixed to the end 40a of the shank, or may be an integral part of it. As illustrated the rod-like member 42 is adapted to extend through the perforation 41 in the strap. The protruding end of the extension 42 may be provided with means for preventing its withdrawal through the hole 41. As indicated in the drawing, the extension 42 may be provided with a transverse perforation (not shown) into which a pin 43 may be inserted. In this embodiment the external diameter of the shank 40 and internal diameter of the perforation 3 will be so dimensioned as to permit free rotation of the shank in the perforation. Rotation of the shank in the perforation 3 will simultaneously cause rotation of the extension 42 in the hole 41. The extension 42 and the transverse pin 43 serve as a retaining means preventing the accidental removal of the shank 40 from the perforation 3, but removal for replacement or repair purposes can be easily achieved by simply removing the pin 43 and withdrawing the shank and the extension from the perforations 3 and 41 respectively.

FIG. 9 illustrates another embodiment of a retaining means. Again, the lug is identical to the lug illustrated in FIG. 8 and like parts have been given like index numerals. The shank 44 is the shank of a cutter bit. The end 44a is adapted to abut the surface 4d of the strap 4 for gauge determining purposes. Centrally of the end 44a the shank is provided with an extension 45. The extension 45 is suitably affixed to the shank and is made of appropriate resilient material. The extension 45 is bifurcated, and the bifurcations are upset as illustrated. In this embodiment, the shank 44 is free to revolve in the perforation 3 and the extension 45 is free to revolve in the perforation 41. As the shank 44 is seated in the lug 1, the bifurcations of the extension 45 will be bent toward each other and will pass through the perforation 41. Once they have reached a position beyond the perforation 41 the bifurcations will assume their normal position and will serve in connection with the strap 4 as a retaining means for the shank. Removal of the shank may be accomplished by a suitable prying tool or by means of blows applied to the end 44a. As the shank 44 moves away from the strap 4, the bifurcations of the extension 45 will again be forced toward each other and will pass through the perforation 41 finally releasing the shank.

FIG. 10 illustrates a second embodiment of a socket member or lug having a rear abutment surface. The lug generally indicated at 46 has a body portion 47 with a shank receiving perforation 48. The perforation 48 extends from the front surface 49 to the rear surface 50. The front and rear surfaces 49 and 50 may be substantially parallel. The body 47 has a rearward extension 51 which includes an upwardly extending anvil or abutment means 52. The anvil 52 is provided with an abutment surface 53 which is substantially parallel to the rear surface 50 and perpendicular to the axis of the shank receiving perforation 48. It will be understood by one skilled in the art that a bit and bit adapter structure of the type shown in FIG. 1, or the bit structure of the type shown in FIG. 4 may be used with the lug of FIG. 10. The abutment surface of the bit or bit adapter will contact the abutment surface 53 to determine the gauge of the bit, and the roll pin 18 will prevent removal of the bit or bit adapter from the perforation 48. The space between the rear surface 50 and the abutment surface 53 is sufficient to permit rotation of the bit or bit adapter without interference to the roll pin 18.

FIG. 11 shows a lug of the type illustrated in FIG. 10 and like parts have been given like index numerals. In this instance, however, the perforation 48a is of a larger diameter to accept a sleeve 54 of the type described with respect to FIGS. 5 and 7. The sleeve 54 may be held in the perforation 48a by any suitable means including a press fit.

The anvil portion 52 of the lug is provided with a perforation 55 which is substantially coaxial with the perforation 48 in the lug and the perforation 54a in the sleeve. The perforation 55 is adapted to receive the shank 56 of an abutment means 57. The abutment means 57 is supported by the anvil portion 52 of the lug and presents an abutment surface 58 parallel to the surface 50 of the lug. Thus, in this structure, the lug is provided with a replaceable abutment surface. The abutment means 57 may be held in place by any suitable means including a press fit of the shank 56 in the perforation 55. The abutment means may be made of any appropriate durable material such as medium carbon alloy or the like and may be replaced when worn by the rotation and abutment thereagainst the end of a cutter bit or cutter bit adapter. Replacement may be accomplished by means of a suitable prying tool inserted between the abutment means 57 and the anvil. When necessary, an appropriate tool may be inserted into the rear end of the perforation 55 whereby blows may be applied to the shank 56.

It is also within the scope of the present invention to provide the lug of the type shown in FIG. 10 with a permanent abutment means in the form of a disc or the like of material such as tungsten carbide, titanium carbide or chromium carbide brazed to the surface 53 (note FIG. 32).

The sleeve 54 again has a dual purpose. It is the sleeve which is subjected to the wear caused by the rotation of the shank of the bit or bit adapter. Furthermore, the sleeve may serve as a part at least of the means for retaining the bit or bit adapter in the perforation 54a.

In FIG. 11 a bit 59 having a conical nose 60, a hard cutting tip 61 and a rear abutment surface 62 is shown. Near its rear end the bit shank is provided with an annular groove 63. Between the groove 63 and the abutment surface 62 there is a peripheral flange 64 having angled edge portions 64a and 64b. While it is not a necessity, the portions 64a and 64b may have an angularity of approximately 45° to the axis of the bit.

The groove 63 is adapted to receive a ring 65 of resilient stretchable material such as rubber, plastic and the like. The ring 65 may also be a loop of coil spring material. The ring 65 cooperates with the flange portion 64b and the rear surface of the sleeve 54. There may be an annular undercut 66 in the sleeve 54 to prevent the bit from being removed from the sleeve perforation 54a.

In FIG. 12, where like parts have been given like index numerals, the action of the ring 65 is illustrated. The bit 59 is inserted in the perforation 54a of the sleeve and the flange 64 is allowed to extend beyond the surface 50 of the lug. The ring 65 may then be forced over the flange 64 and this is aided by the sloping portion 64a. Once over the flange 64 the ring will snap in place in the groove 63. In the normal cutting operation, the cutting forces will tend to cause the bit 59 to abut the surface 58 and to rotate within the sleeve. Should forces occur tending to pull the bit away from the abutment surface 58, the ring 65 will be caught between the annular undercut 66 in the sleeve 54 (or the rear surface of the sleeve when no undercut is provided) and the sloping surface 64b of the bit flange 64 preventing removal of the bit from the sleeve. The undercut 66 in the sleeve will prevent radial expansion of the ring so that it cannot be forced over the bit flange 64.

When the bit 59 is to be replaced, the ring may be forced over the flange 64 and removed from the bit when the bit is in a position such that the bit surface 62 is adjacent the abutment surface 58. In this way, the ring serves as a positive retaining means which may be easily applied to or removed from the bit by hand without the necessity of a tool.

Since the groove 63 in the shank 59 extends beyond the confines of the sleeve 54, and since the critical zone of shank 59 is defined as extending from point B to a point beyond and in the vicinity of point A (FIG. 11), there are no stress-raising diameter changes within the critical zone.

In FIG. 13 the lug, the replaceable abutment surface and the sleeve are the same as those illustrated in FIGS. 11 and 12, and like parts have been given like index numerals. In this instance, however, a bit 67 and a bit adapter 68 are shown. Again, the bit adapter is provided with a tapering nose 69 substantially conforming in shape to the conical inner surface of the bit. The bit is provided with a hard cutting tip 70. The rear end of the shank 68 may be configured in the same fashion as the rear end of the shank 59 in FIGS. 11 and 12, having the annular groove 63, the abutment surface 62a and the peripheral flange 64 with the sloping surfaces 64a and 64b. It will be understood by one skilled in the art that that surface of the flange 64 adjacent the groove 63 need not be sloping and could, for example, be perpendicular to the axis of the shank. In FIG. 13 the surface 64c is shown as radiused and the retaining means is shown as being a split metal ring 71, having a circular cross section.

It will be understood by one skilled in the art that when a bit and bit adapter of the type shown are used, the bit 67 can be removed from the bit adapter 68 by means of a prying tool located between the forward flange 54b of the sleeve 54 and the bottom edge of the bit skirt. Thus, an even stronger retaining means than the resilient ring 65 of FIGS. 11 and 12 may be desired. As shown in FIG. 13, the split metal ring 71 serves as a strong retaining means and may be snapped in place in the notch 63. This may be accomplished by forcing the ring over the flange 64 or by applying the ring radially into the groove.

Any forces tending to pull the bit adapter out of the sleeve perforation 54a, as well as the prying force applied during the bit removal procedure will be resisted by the interaction of the metallic ring 71, the annular undercut surface 66 in the sleeve 54 and the surface 64c of the bit adapter flange 64 in the same manner as that described with respect to the resilient ring 65 in FIG. 12. The application of the metallic ring 71 may be accomplished by hand or by means of an appropriate tool.

For purposes of an exemplary showing, FIG. 13 also illustrates another means for retaining the sleeve 54 in the perforation 48a of the lug. In this instance, the lug is provided with a transverse bore 72 which is perpendicular to and which intersects a portion of the lug perforation 48a. The sleeve 54 has a notch 73 in one peripheral portion thereof. When the sleeve is inserted in the lug perforation 48a and the notch 73 is aligned with the bore 72, a pin 74 may be inserted in the bore. The engagement of the pin and the sleeve notch 73 will retain the sleeve in position in the lug perforation 48a.

FIG. 14 illustrates another form of bit retaining means. In the embodiment the lug, the replaceable abutment surface and the sleeve are substantially the same as illustrated in FIGS. 11, 12 and 13, and like parts have been given like index numerals. It will be noted that the sleeve is shown without an annular undercut portion 66 although one may be provided if desired. A cutter bit, similar to the cutter bit of FIG. 11, comprises a shank 75, a conical nose 76, a hard cutting tip 77 and a rear abutment surface 78. In this instance, however, the rearward portion of the shank 75 is provided with a narrow annular groove 79 for the receipt of a split metal ring 80.

The retaining means of FIG. 14 would normally be used when the forces tending to pull the bit shank out of the sleeve perforation 54a are not expected to be great. For this reason the split ring 80 may be made of lighter metal than the ring 71 of FIG. 13.

The ring 80 may be applied to and removed from the bit shank by hand or by the use of an appropriate tool. It will be noted that the groove 79 is so located on the bit shank 75 that when the ring 80 is in place the bit may be pulled away from the abutment surface 58 (before the ring 80 contacts the rear edge of the sleeve 54) to the extent that the abutment surface 78 of the bit shank and the surface 58 of the abutment 57 will be spaced slightly from each other. This space is sufficient for the insertion between the last two mentioned surfaces of an appropriate prying tool.

It will be understood by one skilled in the art that in the embodiment shown in FIGS. 11 through 14 the ring-like retaining means are illustrated as having a circular cross section. The invention is not intended to be so limited and the ring-like retaining means may have any suitable cross sectional configuration. The shape of the undercut 66 may be varied depending upon the cross sectional configuration of the ring-like retaining means used. In addition, no undercut need be provided. An undercut is particularly desirable when the forces tending to pull the adapter or bit shank out of the lug perforation are expected to be great. Similarly, in the embodiments of FIGS. 11 through 14, the provision of a sleeve is optional. If there is no sleeve, and if an undercut is desired, the undercut will be located in the rear surface 50 of the lug itself.

FIG. 15 illustrates an instance where the sleeve itself may be used as the bit retaining means. In this figure the lug, the abutment means and the bit are substantially the same as that shown in FIGS. 11 and 12, and like parts have been given like index numerals.

In this embodiment the sleeve 81 is provided with a gauge determining flange 82 and may be held in the lug perforation 48a by any suitable means such as a press fit, or a transverse pin (see FIG. 13).

The rear end of the sleeve 81 extends beyond the surface 50 of the lug and is provided with a plurality of slots, some of which are shown at 83. The sleeve segments (some of which are shown at 84) formed by the slots are bent slightly inwardly as shown, to form a restricted opening generally indicated at 85. The diameter of the restricted opening 85 is slightly larger than the diameter of that portion of the bit shank 59 forming the annular groove 63.

In the use of this assembly the bit shank 59 is inserted into the sleeve 81. As the end of the bit shank approaches the rear end of the sleeve, the angled bit flange portion 64a will contact the inwardly bent segments 84 causing them to expand radially. When the bit is fully seated by blows from an appropriate tool, the sleeve segments 84 will snap over the flange 64 and will contract to their normal position. In their normal position the opening 85 formed by the sleeve segments will be of such size as to allow free rotation of the bit, but to prevent removal of the bit by ordinary forces encountered in the mining process by virtue of the abutment of the segments against the bit flange surface 64b.

To remove the bit from the lug and sleeve assembly, an appropriate prying tool may be inserted between the surface 58 of the abutment means 57 and the surface 62 of the bit. When a prying force is applied the slanted bit flange surface 64b will cause a radial expansion of the sleeve segments 84 so as to permit the bit flange 64 to pass between them. Once the bit flange 64 has cleared the sleeve segments 84 the bit is free to be removed from the sleeve perforation 54a.

FIGS. 17 and 18 show a slightly modified form of sleeve including integral means for retaining the sleeve in the lug perforation. The lug of FIG. 17 is the same as that shown in FIG. 11, and like parts have been given like index numerals. In this embodiment the sleeve 86 is similar to the sleeve 54 of FIG. 11 but extends slightly beyond the surface 50 of the lug. The sleeve is provided with two parallel slits 87 and 88 forming a deformable detent 89. The detent 89 may be deformed to form a slanted surface 90 and a second surface 91 substantially perpendicular to the long axis of the sleeve.

As will be understood from FIG. 17, as the sleeve 86 is inserted in the lug perforation 48a the detent surface 90 will cause the detent to be depressed inwardly. When the sleeve 86 is fully seated in the lug perforation the detent will snap into the position shown in FIG. 17, and the detent surface 91 will engage the lug surface 50, holding the sleeve in position. To remove the sleeve, it is only necessary to distort the detent 90 (by means of a suitable tool) toward the axis of the sleeve until the detent surface 91 clears the lug surface 50.

The sleeve 86a in FIG. 18 differs from that of FIG. 17 only in that the detent 89a extends beyond the rear edge 86b of the sleeve. When a sleeve such as that of FIG. 18 is used, the rear edge 86b of the sleeve will be substantially coplanar with the lug surface 50.

FIG. 19 illustrates the use of a lug of the present invention together with a resilient retaining means of the type shown in United States Letters Patent No. 2,965,365, dated Dec. 20, 1960, in the name of the present invention. The lug is substantially the same as that shown in FIG. 11, and like parts have again been given like index numerals.

In this embodiment the lug is provided with a transverse hole 92 which contains a resilient holding device comprising a metallic rod 93 encased in a body of resilient substance 94, excepting upon one side at that portion where the rod traverses the perforation 48a of the lug.

In this instance, the cutter bit shank 95, having an abutment surface 96, is provided with an annular notch generally indicated at 97. That portion of the shank 95 between the abutment surface 96 and the notch 97 tapers, as shown, to form a deflecting surface 98. That portion 99 of the notch 97, adjacent the deflecting surface 98, has an opposite taper as shown.

In the use of this embodiment, the cutter bit shank is inserted in the lug perforation 48, and the rod 93 of the resilient retaining means is first contacted by the deflecting surface 98 of the cutter bit shank. As the cutter bit shank is driven home by a blow from a suitable tool, the deflecting surface 98 will cause the rod 93 to be forced out of the lug perforation 48a. Once the deflecting surface 98 has cleared the rod 93, the rod will be free to snap into the notch 97. As shown in FIG. 19, when the cutter bit shank 95 is in its fully seated position the central portion 100 of the notch 97 clears the rod 93 so that the cutter bit is free to rotate. Removal of the cutter bit by forces encountered during the mining operation is precluded by the interaction of the rod 93 and the notch surface 99.

The bit may be removed from the lug perforation 48a by means of a suitable prying tool inserted between the abutment surface 58 and the bit surface 96. During this removal operation, the notch surface 99 will deflect the rod 93 out of the bit perforation 48, freeing the bit for removal. It will be understood that the embodiment shown in FIG. 19 may incorporate a sleeve (not shown) in the perforation 48a. The sleeve may either extend up to the resilient retaining means, or be provided with a cut-away portion so as not to interfere with the action of the resilient retaining means.

Figure 41:
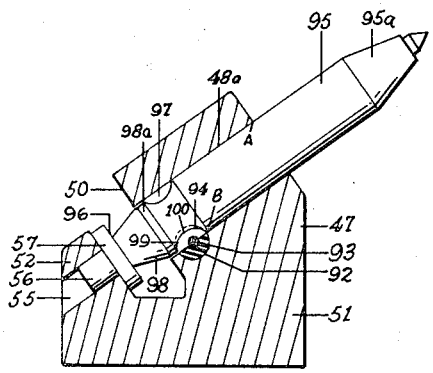
FIG. 41 illustrates an assembly similar to that of FIG. 19 with a slightly modified cutter bit having no stress-raising changes in diameter within the critical zone.

FIG. 41 illustrates the assembly of FIG. 19 with a slight modification. Again like parts have been given like index numerals. In this instance the diameter of the shank 95 at that portion 98a between the notch 97 and the deflecting surface 98 is slightly less than the diameter of that portion of the shank from the notch 97 to the nose 95a. Thus the critical zone of shank 95 will lie between points A and B and will be free of stress-raisers.

FIG. 16 illustrates an exemplary form of prying tool which may be used to remove the bits or bit adapters of the present invention, and particularly those embodiments shown in FIGS. 6, 7, 9, 15 and 19. The tool comprises a shank 101 having prying means 102 at one end and a head 103 at the other end. The head 103 may be made of any material suitable for administering blows to the cutting end of the bit to insure proper seating of the bit. The shank 101 has a rearwardly extending gauge.

For purposes of an exemplary showing, the prying end 102 is indicated in dotted lines in FIG. 15. It will be noted that the abutment 104 engages the abutment means 57 of the lug so that the prying end 102 will be properly located to act upon the surface 62 of the bit shank 59. It will be understood that as the shank 101 is rocked or pivoted rearwardly in the direction of the arrow C, the prying end 102 of the tool will move forwardly disengaging the bit shank from the sleeve segments 84. When the tool of FIG. 16 is used in connection with a lug of the type shown in FIGS. 1, 2 and 3, the tool abutment 104 will coact with the portion 4c of the U-shaped abutment member 4.

A third embodiment of the lug or socket member of the present invention is illustrated in FIGS. 20 and 21. Referring to FIG. 20, the socket member comprises a body 105 with a slanting forward surface 106 and a rear surface 107. The socket member has a shank receiving perforation 108 extending from the surface 106 toward the surface 107. The perforation 108 terminates, short of the surface 107, in an abutment surface 109. A bleed hole 110, coaxial with the perforation 108, extends from the abutment surface 109 through the rear surface 107 of the socket member. The bleed hole 110 assures that cutting fines and foreign material will not accumulate in the shank receiving perforation 108. Such an accumulation of fines and foreign material would impair the installation and removal of a cutter bit shank and might impair the ability of the cutter bit shank to revolve in the perforation 108. It will be understood by one skilled in the art that the bottom 111 of the socket member may be affixed to any suitable driven element such as a cutter chain, cutter wheel, or the like. It will also be understood that the lug of FIG. 20 could be an integral part of a suitable driving element.

A shank 112 of a cutter bit or adapter is illustrated as located in the perforation 108. The rear abutment surface 113 of the shank is adapted to coact with the abutment surface 109 of the lug. The shank 112 is cylindrical and of substantially constant cross section throughout its length. The diameter of the shank is such that the shank is freely rotatable within the perforation 108.

The rear end of the shank 112 has an annular notch 114. The body of the lug 105 is provided with a transverse perforation 115 which intersects the shank receiving perforation 108. When the shank 112 is located in the perforation 108, a pin 116 may be inserted in the perforation 115. That portion of the pin 116 which extends into the perforation 108 will coact with the shank groove 114 to prevent removal of the shank. The shank groove 114 will be so dimensioned as to accept a part of the pin 116 and yet permit free rotation of the shank 112. Removal of the shank 112 simply requires removal of the pin 116.

It will be understood by one skilled in the art that the perforation 115 may be enlarged to receive a resilient retaining means of the type described above (see FIG. 19). The pin 116 may then be a part of such a resilient retaining means.

It is preferred to have the portion 112a of the shank 112 of slightly smaller diameter than that portion of the shank extending forwardly of the groove 114. Thus the critical zone of the shank 112 will lie between points A and B and be free of stress-raising diameter changes.

FIG. 21 shows a lug or socket member similar to that of FIG. 20 and like parts have been given like index numerals. The shank of a cutter bit or adapter is also illustrated. The shank is the same as that shown in FIG. 20 and again like parts have been given like index numerals.

The embodiment of FIG. 21 differs from that of FIG. 20 only in the retaining means used to hold the shank 112 in the perforation 108. In this instance (see also FIGS. 22 and 23), the lug body 105 is provided with a pair of perforations 117 and 118. The perforations lie in a plane perpendicular to the axis of the shank receiving perforations 108 and extend downwardly from the top of the lug. The perforations 117 and 118 intersect the shank receiving perforation 108.

In this instance, a generally U-shaped retaining means 119 may be use. The retaining means 119 may be made of any suitable material such as wire, rod stock or the like, and has two downwardly depending legs 120 and 121 adapted to extend into the perforations 117 and 118 respectively. The legs 120 and 121 will cooperate with the notch 114 in the shank 112 to retain the shank within the lug perforation 108, in much the same way as does the pin 116 in FIG. 20. The retaining means 119 may also be provided with a small U-shaped extension 122 which will stand slightly above the top edge of the lug body 105. Any suitable tool may be inserted between the lug body 105 and the extension 122 so that the resilient retaining means 119 may be removed by a simple prying action.

The lugs or socket members of the general types shown in FIGS. 1, 10 and 20 may themselves be modified to serve as bit holders. When in the form of bit holders, they will be provided with shanks, adapted to be received in the shank receiving perforations of conventional lugs or socket members on mining machine chains, cutter wheels or cutter arms.

When the mounting means of the present invention are made in the form of bit holders for use with conventional socket members, the bodies of the bit holders will be substantially the same as the above described lug bodies. As is well known to one skilled in the art, there are several conventional types of socket members in use today, and the type of shank with which a bit holder of the present invention is provided will depend upon the type of conventional socket member with which the bit holder is intended to be used. While size does not constitute a limitation on the present invention, it will generally be preferable to make the bodies of the bit holders and the bits or bit and adapter assemblies smaller than the bodies of the lugs and the bits and bit assemblies described above.

FIG. 24 shows a bit holder comprising an adaptation of the lug or socket member illustrated in FIGS. 1 through 9. The bit holder generally indicated at 123 has a body 124 having a forward surface 125 and a rear surface 126. The holder also has a U-shaped strap-like element 127 providing an abutment surface 128. The abutment surface 128 extends across and is spaced from the rear opening of the shank receiving perforation 129. As indicated above with respect to the lug of FIGS. 1 through 9, the strap element 127 may be integral with the body 124 or may be permanently affixed to the rear surface or the sides thereof.

The bit holder of FIG. 24 may be used with any of the bits or adapter-bit assemblies and retaining means described with respect to FIGS. 1 through 8. Similarly, the shank receiving perforation 129 may be enlarged and provided with sleeve means, as described with respect to FIGS. 5 and 7 above. The base or bottom 130 of the body 124 will have a downwardly depending shank 131 adapted to be received in the shank receiving perforation of a conventional socket member (not shown). While the configuration of the shank will vary depending upon the type of conventional socket member and retaining means being used, for purposes of an exemplary showing the bit holder of FIG. 24 is illustrated as having a shank of the type used with that form of conventional socket member employing the resilient retaining means taught in the above mentioned Letters Patent No. 2,965,365. Shanks of the type shown at 131 are described in that patent and others including United States Letters Patent No. 3,114,537, dated Dec. 17, 1963, in the name of the present inventor. The shank 131 is of a width substantially equal to the width of the shank receiving perforation in the socket member, and has a vertical front edge 132 and a horizontal bottom edge 133. The rear of the shank 131 has a short vertical edge 134, a notch 135 and a downwardly and inwardly slanting surface 136. During installation the slanting surface 136 will cause the pin of the resilient retaining means (not shown) to be depressed and removed from the socket member perforation so that the bit holder may be fully seated. In its fully seated position, the pin of the resilient retainer will be engaged in the notch 135. Removal of the bit holder may be accomplished by any suitable prying tool. An upward force on the bit holder will cause the notch surface 135a of the shank to coact with the resilient retaining means pin to depress the pin out of the shank receiving perforation in the socket member, releasing the shank 131.

The bit holder means of FIG. 24 may also be provided with one or more gauge determining abutments 137 and 138. The surfaces 137 and 137 will cooperate with the top of the socket member and will determine the depth to which the shank 131 will extend in the socket member perforation.

FIGS. 25 and 26 show a bit holder generally indicated at 139 having a body 140 comprising an adaptation of the lug or socket member described with respect to FIGS. 10 through 19. The body 140 has a shank receiving perforation 141 extending from the front surface 142 through the rear surface 143. The front and rear surfaces are substantially parallel. The body 140 has a rearward extension 144 and an upwardly extending anvil or abutment portion 145. The abutment 145 has an abutment surface 146 spaced from and substantially parallel to the rear surface 143. The abutment surface 146 is perpendicular to the axis of the shank receiving perforation 141. An additional abutment means (not shown) may be removably or permanently affixed to the surface 146 as described above (see FIG. 11).

The bit holder of FIG. 25 may be used with any of the bits or bit-adapter assemblies and any of the retaining means described with respect to FIGS. 11 through 19. Similarly, the shank receiving perforation 141 may be enlarged and provided with a sleeve as shown in FIGS. 11 through 15 and 17 and 18.

For purposes of an exemplary showing, the holding means 139 is illustrated as having a shank 147 of a cutter bit or an adapter-bit assembly located in the perforation 141. The end 148 of the shank abuts the surface 146 of the holding means. The shank 147 is provided with a groove 149 adapted to receive a resilient ring 150 of rubber, plastic or coil spring material, as described with respect to FIGS. 11 and 12 above. The perforation 141 may have an annular undercut 151 equivalent to the undercut 66 in FIG. 12.

The holding means 139 is shown as being mounted in a conventional lug or socket member 152. The socket member 152 has a shank receiving perforation 153 and an additional perforation 154 intersecting the perforation 153. The perforation 154 is provided with internal threads and is adapted to receive a bolt-type retaining means 155 of well known character. The upper portion of the socket member has an upstanding forward abutment 156 and an upstanding rear abutment 157. The rear abutment is bifurcated to provide a slot or notch 158 therein.

As shown in FIG. 25, the holding means 139 has a downwardly depending shank 159 which extends into the shank receiving perforation 153 of the socket member. The body 140 of the holding means lies between the upstanding abutments 156 and 157. The rear surface of the holding means body may be provided with an outstanding lug or tongue 160 which is received in the notch or slot 158. The tongue 160 will help the holding means 139 to resist any side thrust imparted to it or to the cutter bit.

The holding means 139 has at least one gauge determining abutment surface 161 controlling the depth to which the shank 159 extends in the perforation 153. The rear edge 159a of the shank is substantially vertical and the bottom edge 159b is substantially horizontal. The front edge 159c of the shank 159 may slant downwardly and outwardly as shown. The threaded perforation 154 of the socket member may also be slanted so that the axis of the bolt-type retainer 155 will be substantially perpendicular to the shank edge 159c. Thus, should the end of the retainer 155 or the shank edge 159c be subject to wear, forces tending to pull the bit holder shank out of the perforation 153 will create a wedging action between the retainer 155 and the slanted shank edge 159c.

FIG. 27 shows a bit holder similar to that of FIG. 25 but adapted for use with a conventional socket member of the type utilizing a resilient retaining means of the nature described in the above mentioned United States Letters Patent No. 2,965,365. Again, the bit holder of FIG. 27 may be employed with any of the cutter bit or bit-adapter assemblies and any of the retaining means described with respect to FIGS. 11 through 19. For purposes of an exemplary showing, a shank of a cutter bit or adapter and a retaining means identical to those shown in FIG. 25 are illustrated, and like parts have been given like index numerals. The bit holder of FIG. 27 has a shank receiving perforation and an abutment surface substantially identical to the bit holder of FIG. 25, and again like index numerals have been used.

The body 140a of the embodiment of FIG. 27 differs from that of FIG. 25 only in that the front portion of the body 140a may be reduced as at 161. Also no tongue need be provided, such as the tongue 160 in FIG. 25.

The embodiment of FIG. 27 is shown as being mounted in a conventional socket member 162 of the type having a shank receiving perforation 163 and a transverse perforation 164 intersecting the shank receiving perforation. The perforation 164 is adapted to receive a resilient retaining means of the type described above comprising a pin 165 and a body of resilient material 166.

The bit holder has a downwardly depending shank 167 substantially identical to that shown in FIG. 24. The shank 167 is of a width substantially equal to the width of the perforation 163. The forward edge of the shank 167a is vertical, and the lower edge 167b of the shank may be horizontal. The rear edge of the shank 167 comprises a vertical portion 167c, a notch 167d and a downwardly and inwardly sloping surface 167e. As described with respect to FIG. 24, when the shank 167 is inserted in the shank receiving perforation 163, the surface 167e will cause the pin 165 to be depressed into the resilient material 166 and out of the perforation 163 to permit a seating of the bit holder. In its seated position, the bit holder will be retained in position by coaction of the pin 165 and the notch 167d. Removal of the bit holder may be accomplished by means of a suitable prying tool engaging the reduced portion 161 of the bit holder body 140a. An upward force on the bit holder will cause the pin 165 to coact with the slanted portion 167f of the notch 167d. This coaction, in turn, will cause the pin 165 to be forced out of the shank receiving perforation 163, releasing the bit holder shank 167. As in the case of the bit holder of FIG. 24, the bit holder of FIG. 27 may be provided with one or more gauge determining abutment surfaces 168 and 169.

FIG. 28 shows a bit holder generally indicated at 170 and having a body 171 adapted from the lug or socket member of FIG. 20. The body 171 has a forward surface 172 and a rear surface 173. A shank receiving perforation 174 extends inwardly from the front surface 172 and terminates in an abutment surface 175. A bleed hole 176, coaxial with the perforation 174, extends from the abutment surface 175 to the rear surface 173 of the bit holder body.

In the embodiment of FIG 28 the conventional lug or socket member and the shank of the bit holder 170 are identical to the socket member and shank of FIG. 25, and like parts have been given like index numerals. As in the case of the structure of FIG. 25, the body 171 of the bit holder of FIG. 28 may have a gauge determining abutment surface 177 and a rearwardly extending tongue 178.

The body 171 is provided with a transverse hole 179 intersecting the shank receiving perforation 174. For purposes of an exemplary illustration, a shank 180 of a cutter bit or cutter bit-adapter assembly is shown seated in the perforation 174. The rear end 181 of the shank coacts with the abutment surface 175. The shank is also provided with an annular notch 182 which cooperates with a pin 183 in the same manner described with respect to notch 114 and pin 116 in FIG. 20. Preferably the portion 180a of the shank 180 will be of slightly reduced diameter so that the critical zone of the shank will lie between points A and B and be free of stress-raisers.

The bit holder embodiment of FIGS. 29 and 30 (generally indicated at 183) differs from that of FIG. 28 only in the type of retaining means utilized for the bit shank. For this reason, like parts have been given like index numerals. In this instance, the bit holder 183 has two perforations 184 and 185 which intersect the shank receiving perforation 174. A retaining means, identical to that shown in FIG. 23 is used, the legs 120 and 121 adapted to enter the perforations 184 and 185 in the same manner as described above.

It will be understood by one skilled in the art that it would not constitute a departure from the spirit of the invention to provide the mounting means of FIGS. 28, 29 and 30 with shanks of the type illustrated in FIGS. 24 and 27 so that these mounting means could be used in socket members of the type shown at 162 in FIG. 27.

FIGS. 31 and 32 show another modification of the present invention wherein a bit holder is provided having a perforation adapted to receive the shank of a cutter bit or bit-adapter assembly. In this instance, however, the rear gauge determining abutment means comprises a portion of the lug or socket member.

Referring to FIG. 31, a bit holder 186 has a shank receiving perforation 187 extending from the front face 188 of the bit holder through the rear face 189 thereof. The lug or socket member, generally indicated at 190, is provided with a shank receiving perforation 191 and an upstanding anvil portion 192. The anvil portion 192 has an abutment surface 193 spaced from the rear surface 189 of the bit holder and substantially perpendicular to the axis of the perforation 187.

For purposes of an exemplary showing, the embodiment of FIG. 31 is shown as having a cutter bit generally indicated at 194 having a shank portion 195 and a head portion 196 with a hard cutting tip 197. It will be understood by one skilled in the art that a bit and bit adapter assembly could be substituted for the cutter bit 194 without departing from the spirit of the invention. The rear end of the shank 195 has an abutment surface 198 and an annular flange or rim 199 which has an external diameter greater than the internal diameter of the bit holder perforation 187. Thus, the peripheral flange 199 will prevent removal of the bit in the cutting direction.

The bit holder 186 has a shank 200 which may be of any suitable configuration. For purposes of an exemplary showing, the shank 200 is shown as having a substantially vertical rear edge 201, a horizontal bottom edge 202 and a substantially vertical front edge 203. The front edge 203 is provided with a notch 204 for the receipt of the end of a bolt-type retaining means 205 mounted in a threaded perforation 206 in the socket member 190. The bit holder may also have shoulders providing abutment surfaces 207 and 208 serving to determine the depth to which the shank 200 will extend into the perforation 191 in the socket member.

In the assembly of this embodiment, the flange 199 on the bit shank requires that the nose 196 of the bit be inserted in the bit holder perforation 187 from its opening in the rear surface 189 of the bit holder. The shank 200 of the bit holder is then inserted in the perforation 191 in the socket member 190 and the bolt-type retaining means is tightened to engage the shank 200 in the notch 204.

While the shank 195 of the cutter bit is of such diameter that it is freely rotatable in the bit holder perforation 187, it cannot be removed from the bit holder without the removal of the bit holder from the socket member 190.

The embodiment of FIG. 32 is similar to that of FIG. 31. A bit holder 209 has a front face 210, a rear face 211 and a shank receiving perforation 212 therebetween. While a bit adapter assembly may be used, for purposes of an exemplary showing a cutter bit 213 is shown having a shank 214 and a nose 215 with a hard cutting tip 216. The rear end of the shank has an abutment surface 217. Near the end of the shank an annular notch 218 is provided for the purpose hereinafter described. The socket member, generally indicated at 219 is similar to that of FIG. 31. The socket member has a shank receiving perforation 220 and an upstanding rear anvil portion 221. The anvil portion 221 has a surface 222 spaced from the rear surface 211 of the bit holder and substantially perpendicular to the axis of the bit holder perforation 212. The surface 222 may itself serve as an abutment surface (as does the surface 193 in FIG. 31) or it may be provided with a replaceable abutment means of the type shown in FIG. 11 or a permanent abutment means as illustrated at 223. The permanent abutment means may be made of tungsten carbide, titanium carbide or chromium carbide and brazed to the surface 222. It will be understood that the embodiment of FIG. 31 may similarly be provided with a replaceable or permanent abutment means in the same manner.

The socket member 219 has an upstanding lug 224. For purposes of an exemplary showing, the lug 224 is illustrated as an integral part of the socket member 219, but it will be understood by one skilled in the art that the lug 224 could be a separate and replaceable member.

As illustrated the lug 224 extends upwardly toward the cutter bit shank in the area of the notch 218. While the lug 224 does not contact the shank in the area of the notch 218 so that the cutter bit may be freely rotatable, it nevertheless extends to a height such that the rear portion of the cutter bit will not clear it, and thus when the bit holder 209 is in seated position the cutter bit is firmly held therein.

As indicated with respect to the embodiment of FIG. 31, the bit holder 209 may have any suitable form of shank. For purposes of an exemplary showing the bit holder is illustrated as having a shank 225 substantially identical to the shank 200 of the bit holder of FIG. 31. The shank 225 includes a notch 226 adapted to cooperate a bolt-type retaining means 227 extending through a threaded perforation 228 in the socket member. The bit holder 209 may also have gauge determining abutment surfaces 229 and 230.

It will be noted that in the embodiment of FIG. 32 the cutter bit 213 may be inserted in the bit holder perforation 212 from the front surface of the bit holder. Thus, in order to remove and replace a cutter bit, it is only necessary to loosen the bolt 227 and raise the bit holder by an amount sufficient to allow the end of the bit to clear the lug 224. A new bit may then be inserted and the bit holder seated in the socket member perforation 220. When the bolt 227 is tightened, both the bit holder and the cutter bit will be firmly held in place.

FIGS. 33 through 36 illustrate additional forms of retaining means in association with lugs or socket members of the type shown in FIG. 10. It will be understood by one skilled in the art that the embodiments of FIGS. 33 through 36 could be provided with shanks of the type shown in either FIG. 24 or FIG. 25, so that the embodiments of FIGS. 33 through 36 could be used as bit holders in conjunction with conventional lug or socket members. It will further be understood that, while for purposes of an exemplary showing, the embodiments of FIGS. 33 through 36 are illustrated as provided with cutter bits, cutter bit-adapter assemblies could equally well be used.

The lug of FIG. 33 is generally designated at 231, having a body portion 232 and an anvil portion 233. The body portion 232 has a shank receiving perforation 234, while the anvil portion 233 has a perforation 235 for the receipt of the shank 236 of an abutment means 237, similar to that shown at 57 in FIG. 12.

A cutter bit, generally indicated at 238, comprises a shank portion 239, a head portion 240, and a hard cutting tip 241. At the rear end of the shank 239, there is a coaxial extension 242 of reduced diameter. The extension 242 has at its end an annular rounded flange.

The bit retaining means of the embodiment of FIG. 33 comprises a spring clip 244. The base of the spring clip is provided with a perforation through which the shank 236 of the abutment means 237 extends, so that the spring clip 244 is held in place by the abutment means 237. The arcuate arms 244a and 244b of the spring clip terminate in out-turned ends 244c and 244d respectively.

In the embodiment of FIG. 33, the bit 238 may be inserted in the shank receiving perforation 234 of the lug 231. The rounded flange 243 on the bit extension 242 will first contact the out-turned ends 244c and 244d of the spring clip. This will cause the spring clip arms 244a and 244b to expand in such a way that the flange 243 of the extension 242 will pass beyond the clip ends. When in its fully seated position, the end 245 of the extension 242 will coact with the abutment means 237. The clip ends 244c and 244d will not contact the extension 242 so that the cutter bit will be free to rotate within the lug perforation 234.

The cutter bit may be removed by a simply prying action. The forward motion of the bit will cause a coaction of the extension flange 243 and the clip ends 244c and 244d in such a way that the clip arms will be expanded and the cutter bit released. The slip 244 may be made of any suitably strong resilient material and may be replaced by removal of the abutment means 237.

The embodiment of FIG. 34 shows a socket member or lug 246 similar to that of FIG. 33. The lug 246 has a body portion 247 and an anvil portion 248. The anvil portion 248 has an abutment surface 249, while the body portion 247 has a shank receiving perforation 250. For purposes of an exemplary showing, a cutter bit generally indicated at 251 is shown having a shank portion 252, a head portion 253 and a hard cutting tip 254. The rear end of the shank portion 254 has an abutment surface 255. Near its end, the shank 252 is provided with an annular notch 256.

The bottom rear portion of the shank receiving perforation 250 has a longitudinally extending notch 257 with a first depression 258 and a second depression 259. A resilient Z-shaped clip 260 is located within the notch 257. The forward, downwardly depending end 260a of the clip 260 is retained within the depression 259. The rearwardmost, upturned end 260b of the clip 260 is adapted to be received within the notch 256 of the shank 252, so that the clip 260 will serve as a retaining means for the cutter bit 251. The end 260b of the clip does not contact the surface of the notch 256, so that the bit 251 is free to rotate within the shank receiving perforation 250.

The first depression 258, in the notch 257 in the lug member is filled with a resilient material indicated at 261. The resilient material 261 tends to hold the clip 260 in the position illustrated. Nevertheless, the resilient material 261 will also permit the downward distortion of the rear end of the clip 260 which, in turn, will permit the insertion or removal of the cutter bit in the socket member. Depression of the end 260b of the clip 260 may be accomplished by any tool capable of applying a downward pressure on the clip. In addition, it may be accomplished by a tool similar to that shown in FIG. 37 in a manner analogous to that which will be described with respect to FIGS. 36, 38 and 39. It will further be understood that, when the cutter bit 251 is removed from the shank perforation 250, the clip 260 may be easily replaced by disengaging the end 260a from the depression 259.

FIG. 35 illustrates another form of retaining means. In the figure, a lug, generally indicated at 262, has a body portion 263 and an anvil portion 264. The anvil portion is provided with an abutment surface 265, and the body portion is provided with a shank receiving perforation 266. A cutter bit, generally shown at 267, has a shank portion 268, a head portion 269 and a hard cutting tip 270. The end of the shank 268 comprises an abutment surface 271 adapted to cooperate with the abutment surface 265 of the lug. Near the end of the shank 268, there is an annular notch 272.

At the bottom of the shank receiving perforation 266, there is a longitudinally extending notch or slot 273. The slot 273 is intersected by a perforation 274 extending upwardly and inwardly from the front edge of the lug 262. In this embodiment, the retaining means comprises a clip 275, made of any suitable resilient material, and having any suitable cross section. For example, the clip 275 may be made of resilient steel wire or the like. The forward end of the clip has a downwardly depending portion 276 adapted to be received within the perforation 274. The body of the clip 275 is adapted to be received within the slot 273. The rear end 277 of the clip 275 extends outwardly of the shank receiving perforation 266. The clip end 277 is slightly upset so as to form a dimple therein.

It will be understood that in the embodiment of FIG. 35 the cutter bit 267 may be inserted rear end foremost in the shank receiving perforation. The abutment surface 271 of the cutter bit shank will contact the dimpled end 277 of the clip and the dimple serving as a cam means, the clip end 277 will be depressed downwardly, permitting the shank end to pass beyond it. Once the cutter bit is fully seated, the dimpled end 277 of the clip 275 will lie in the area of the shank notch 272, but will not contact the shank so that the shank is free to rotate within the lug perforation 266. To remove the bit, it is only necessary to apply a prying force at the abutment surface 271 thereof. The forward motion of the bit will cause the rear end of the bit to engage the camming dimple of the clip 275 causing the end 277 of the clip to be depressed. Depression of the clip end 277 will permit the passage of the shank end beyond it, so that the cutter bit is released and may be replaced. It is also evident that, when the cutter bit 267 has been removed, the clip 275 may, when needed, be replaced by simply disengaging it from the notch or slot 273 and disengaging the clip end 276 from the perforation 274. Should the clip end 276 be wedged in the perforation 274, any suitable tool may be inserted in the perforation 274 for the purpose of shoving the clip end 276 therefrom.

Figures 36, 37:
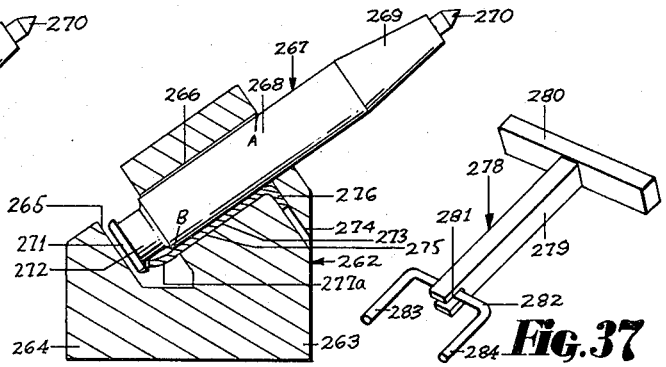
Figure 38:
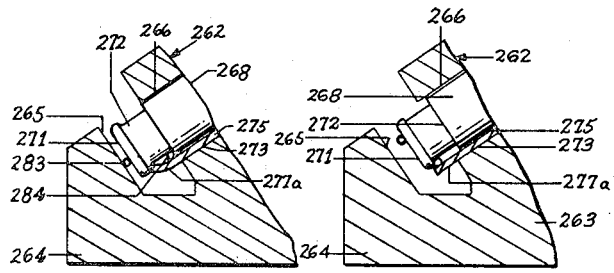
FIGS. 38 and 39 are fragmentary views, partly in cross section, of the assembly of FIG. 36, showing respectively the initial and final position of the tool of FIG. 37 during the bit removal procedure.
Figure 39:
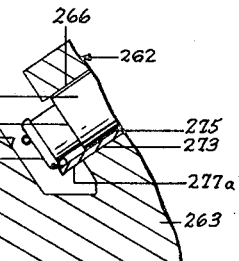

The embodiment shown in FIGS. 36, 38 and 39 is substantially identical to that shown in FIG. 35, and like parts have been given like index numerals. In this instance, however, the end 277a of the clip 275 is not provided with a dimple, but rather is curved slightly upwardly as shown. During insertion of the bit 267, the abutment surface 271 will depress the clip end 277a to the extent necessary to allow the shank end to pass thereby. When the cutter bit 267 is in fully seated position, the upwardly curved end 277a of the clip will be located in the area of the notch 272 and will serve as a retaining means for the cutter bit. When the cutter bit is fully seated, the end 277a of the clip 275 does not contact the surface of the shank at the notch 272, so that the cutter bit is free to rotate within the shank receiving perforation 266 of the lug 262.

In order to remove the cutter bit 267 from the lug in the embodiment of FIG. 36, the end 277a of the clip 275 must be depressed downwardly by an amount sufficient to permit clearance of the rear end of the cutter bit. This depression of the clip end 277a may be accomplished by any suitable tool.

FIG. 37 is a perspective view of one type of tool which may be used to release the cutter bit from the retaining means in the embodiment shown in FIG. 36. The tool, generally indicated at 278, may be provided with a key-shaped handle comprising a shank 279 and a grip 280. The handle may be made of bar stock or the like, with the shank 279 permanently affixed by welding or the like to the grip 280. The forward end of the shank 279 has a notch 281, adapted to receive the base of a U-shaped element 282. The element 282 may again be made of any suitable material such as rod stock, heavy wire or the like. The forwardly extending legs 283 and 284 of the element 282 are substantially parallel.

FIGS. 38 and 39 illustrate the use of the tool 278 to release the cutter bit shank 268 from the end 277a of the retaining means 275. As shown in FIG. 8, the cutter bit is pulled slightly forwardly so that one leg 283 of the tool may be inserted between the shank abutment surface 271 and the lug abutment surface 265. The other leg 284 is inserted between the shank 268 at the notch 272 and the end 277a of the retaining means. Once inserted, the tool may be turned clockwise as shown in FIG. 39. It will be seen that turning the tool in a clockwise direction tends to straighten the curved end 277a of the retaining means 275. When the end 277a is so straightened, the rear portion of the shank 268 may be pulled clear of it, the tool legs removed, and the cutter bit extracted from the shank receiving perforation 266 of the lug 262.

Modifications may be made in the invention without departing from the spirit of it. It will be noted that the three basic types of socket members taught herein and exemplified by FIGS. 1, 10 and 20, and the bit holders illustrated in FIGS. 24 through 31 are similar in that they all present an abutment means engageable by the rear surface of a rotatable shank of a cutter bit or cutter bit-adapter assembly to accomplish the above mentioned objects.

It will be understood by one skilled in the art that the retaining means for the cutter bit or cutter bit-adapter assembly shown in FIGS. 1, 2 and 4 through 7 may be used with a lug of the type shown in FIGS. 10 and 11. Similarly, the retaining means shown in FIGS. 11 through 15 and 19 may be used with a lug of the type shown in FIGS. 1, 2 and 3. When retaining means of the type shown in FIGS. 11, 12 and 13 are to be used with a lug of the type shown in FIGS. 1, 2, 3 or 10, the shank receiving lug perforation 3 or 48 respectively may be provided at its rear end with an annular undercut portion equivalent to that shown at 66 in FIGS. 11, 12 and 13. The same alternate usages of the various forms of retaining means may be made in the bit adapters of the types illustrated in FIGS. 24 through 27.

It will be noted that in all of the embodiments described herein, except those of FIGS. 7 and 19, the cutter bit shank or adapter shank is free of stress-raising changes in diameter, particularly in the critical zone. In all of the embodiments the critical zone lies between the point B and a point just forward of point A, as described above.

As will be understood by one skilled in the art, the points A and B represent the contact points between the cutter bit or adapter shank and the shank receiving perforation when the cutter bit is being driven in the cutting direction. Should the cutter bit be driven in the opposite direction, the point A would shift downwardly and the point B would shift upwardly. This is illustrated in FIG. 1 by the points A' and B'. Irrespective of the direction in which the assembly is being moved, it will be noted that in all of the embodiments of the present invention, except the two above noted, the critical zone of the bit shank or adapter shank is free of stress-raisers.

In many instances cutter bits having integral heads and shanks will be preferred over the bit-adapter assemblies such as those shown in FIGS. 1 and 5. It will be understood by one skilled in the art that the juncture between the slanted head surface 13 and the shank 16 in FIG. 1, and the shallow V-shaped notch 29 in FIG. 5 will themselves constitute stress-raisers, although they are not located in the critical zone, as defined above. When the material being cut is relatively soft, however, cutter bit-adapter assemblies of this type are advantageous in that they permit a change of the cutter bit without having to remove the shank from the shank receiving perforation. In addition, the adapter comprising the major portion of the cutter bit assembly, may be used over and over again, and only the hollow conical cutter bit itself need be replaced.

The embodiments of the invention in which an exclusive property or privilege is claimed are defined as follows:

1. A mounting means for a cutting tool of a mining machine and the like, said cutting tool being of the type having a a shank with circular cross section, a hard cutting tip at one end and an abutment surface at the other end, said mounting means comprising a body portion having a shank receiving perforation, said body being movable in a cutting direction, the axis of said perforation sloping toward said cutting direction and forming an angle of less than 90° therewith such that the resultant cutting stresses will be sustained substantially in line with the axis of said shank, said perforation being of a diameter such that said shank is freely rotatable therein, said perforation having a forward end and a rearward end, an abutment surface in association with the rearward end of said perforation, said abutment surface lying in a plane non-parallel with the axis of said perforation, said abutment surfaces adapted to cooperate with said first mentioned abutment surface on said shank.

2. A mounting means for a cutting tool of a mining machine and the like, said cutting tool being of the type having an elongated shank, a hard cutting tip at one end and an abutment surface at the other end, said mounting means comprising a body portion having a forward surface and a rearward surface, said body having a shank receiving perforation extending therethrough and forming openings in said forward and rearward surfaces, said perforation having a circular cross section of a diameter such as to permit free rotation of said shank therein, said mounting means being movable in a cutting direction, the axis of said perforation sloping toward said cutting direction and forming an angle of less than 90° therewith such that the cutting stresses will be sustained substantially in line with the axis of said shank, abutment means for said shank positioned rearwardly of said body, a portion of said abutment means being spaced from said rearward surface and overlying a portion of said opening therein, said portion of said abutment means having an abutment surface facing said last mentioned opening and lying in a plane non-parallel with the axis of said perforation, said last mentioned abutment surface adapted to cooperate with said abutment surface on said cutting tool.

3. The combination of a cutting tool and a mounting means therefor for use on a mining machine and the like, said cutting tool having a shank with a circular cross section, cutting means in association with one end of said shank, a first abutment surface on the other end of said shank, said mounting means having a shank receiving perforation, said shank located within said perforation and freely rotatable therein, said mounting means being movable in a cutting direction, the axis of said perforation sloping toward said cutting direction and forming an angle of less than 90° therewith such that the cutting stresses will be sustained substantially in line with the axis of said shank, a second abutment surface in association with said mounting means and lying in a plane non-parallel to the axis of said perforation, said first abutment surface on said shank cooperating with said second abutment surface to determine the gauge of said cutting means within said perforation, and retaining means preventing loss of said shank from said perforation.

4. The structure claimed in claim 1 wherein said rearward end of said shank receiving perforation lies within said body portion of said mounting means and comprises said abutment surface.

5. The structure claimed in claim 2 including an elongated sleeve, means for removably affixing said sleeve in said shank receiving perforation, said sleeve having a longitudinal perforation coaxial with said shank receiving perforation.

6. The structure claimed in claim 2 wherein said abutment means comprises a substantially U-shaped strap-like member having a pair of legs extending from said body and a base portion extending between said legs said base portion comprising said portion of said abutment means spaced from said rearward surface and overlying a portion of said last mentioned opening, said base portion bearing said abutment surface.

7. The structure claimed in claim 2 wherein said abutment means comprises an extension on said mounting means, said extension having a rearwardly directed portion and an anvil portion, said anvil portion being spaced from said rearward surface of said body.

8. The structure claimed in claim 2 including a socket member, said abutment means located on said socket member, said socket member having a perforation therein, a shank on said mounting means adapted to be received in said socket member perforation and means for retaining said mounting means shank within said socket member perforation.

9. The structure claimed in claim 2 including a cutting tool, said tool having an elongated shank of substantially circular cross section and of a diameter such as to be received in and freely rotatable in said shank receiving perforation of said mounting means, an abutment surface on the end of said shank adapted to cooperate with said abutment surface on said abutment means, said abutment end of said shank extending beyond said rearward surface of said mounting means, and means in association with said shank for retaining it in said shank receiving perforation.

10. The structure claimed in claim 3 wherein said shank of said cutting tool is free of stress-raising changes in diameter.

11. The structure claimed in claim 3 wherein said cutting tool comprises said shank and an integral conical nose portion.

12. The structure claimed in claim 3 wherein said cutting tool comprises a bit holder and a conical bit, said bit holder comprising said shank and a nose portion, said bit adapted to removably engage said nose portion.

13. The structure claimed in claim 4 wherein said mounting means comprises a socket member.

14. The structure claimed in claim 4 including a shank on said mounting means, said shank adapted to be received in the shank receiving perforation of a socket member.

15. The structure claimed in claim 4 including a cutting tool, said tool having an elongated shank of substantially circular cross section and of a diameter such as to be received in and freely rotatable in said shank receiving perforation, an abutment surface on the end of said shank adapted to cooperate with said abutment surface in said mounting means, and means in association with said shank for retaining it in said shank receiving perforation.

16. The structure claimed in claim 5 wherein said means for retaining said sleeve in said shank receiving perforation comprises a deformable detent, said detent being an integral part of said sleeve, said detent having a sloping surface adapted to cam said detent inwardly of said sleeve when said sleeve is being inserted in said shank receiving perforation, said detent having a second surface perpendicular to the axis of said sleeve, and adapted to engage said rearward surface of said body when said sleeve is in its fully seated position.

17. The structure claimed in claim 5 wherein said mounting means has a transverse hole a portion of which intersects said shank receiving perforation, said sleeve having a notch in a peripheral portion thereof, said means for retaining said sleeve in said perforation comprising a pin extending through said transvere hole and engaging said notch in said sleeve.

18. The structure claimed in claim 5 including a cutting tool, said tool having an elongated shank of substantially circular cross section and of a diameter such as to be received in and freely rotatable in said sleeve perforation, an abutment surface on the end of said shank adapted to cooperate with said abutment surface on said abutment means, and means in association with said shank for retaining it in said sleeve perforation.

19. The structure claimed in claim 6 including an elongated cylindrical sleeve, means for removably holding said sleeve in said shank receiving perforation, said sleeve having a longitudinal perforation coaxial with said shank receiving perforation.

20. The structure claimed in claim 6 wherein said mounting means comprises a socket member.

21. The structure claimed in claim 6 including a shank on said mounting means, said shank adapted to be received in the shank receiving perforation of a socket member.

22. The structure claimed in claim 6 wherein said substantially U-shaped abutment means is an integral part of said mounting means body.

23. The structure claimed in claim 6 wherein said substantially U-shaped abutment means is affixed to said mounting means body by the permanent joinder of the free ends of said legs to said body.

24. The structure claimed in claim 6 including a cutting tool, said tool having an elongated shank of substantially circular cross section and of a diameter such as to be received in and to be freely rotatable in said shank receiving perforation, an abutment surface on the end of said shank adapted to cooperate with said abutment surface on said base portion, and means in association with said shank for retaining it in said shank receiving perforation.

25. The structure claimed in claim 7 wherein said anvil portion includes a replaceable abutment surface.

26. The structure claimed in claim 7 wherein said mounting means comprises a socket member.

27. The structure claimed in claim 7 including a shank on said mounting means, said shank adapted to be received in the shank receiving perforation of a socket member.

28. The structure claimed in claim 8 wherein said abutment means includes a replaceable abutment surface.

29. The structure claimed in claim 8 including a cutting tool, said tool having an elongated shank of substantially circular cross section and of a character such as to be received in and freely rotatable in said shank receiving perforation, a rear portion of said tool shank extending beyond the rearward surface of said body portion of said mounting means, said rear portion of said tool shank terminating in an abutment surface adapted to cooperate with said abutment surface on said abutment means, and means for retaining said tool shank in said shank receiving perforation.

30. The structure claimed in claim 9 wherein said shank has a transverse hole near said abutment end of said shank and in that portion of said abutment end which extends beyond said rearward surface of said mounting means body, said retaining means comprising a removable pin located in said transverse hole, one end at least of said pin extending outside said transverse hole by a distance sufficient to prevent loss of said shank from said perforation.

31. The structure claimed in claim 9 wherein said shank has an annular groove near said abutment end thereof, said retaining means comprising a ring retained in said groove, said ring having an outside diameter greater than the diameter of said shank, said ring lying between said abutment means and said rearward surface of said mounting means body when said shank is in its fully seated position.

32. The structure claimed in claim 9 wherein said shank has an annular notch therein and a resilient retaining means in said mounting means having a portion for engaging in said annular notch.

33. The structure claimed in claim 9 wherein said shank has an annular groove near said abutment end thereof, said shank receiving perforation having a longitudinally slot therein, said retaining means comprising a spring clip located within said longitudinal slot, said spring clip having an end extending beyond said rearward surface of said body portion of said mounting means and lying within said annular notch in said tool shank when said tool shank is seated within said mounting means.

34. The structure claimed in claim 9 wherein said shank has an annular groove near said abutment end thereof, said retaining means comprising a spring clip in association with said abutment surface on said abutment means, said spring clip having resilient arms, the ends of said arms located within said annular shank notch when said shank is seated within said mounting means.

35. The structure claimed in claim 15 wherein said body portion of said mounting means has a transverse hole a portion of which intersects said shank receiving perforation, said cutting tool shank having an annular notch near said end having said abutment surface, said retaining means for said shank comprising a pin extending through said transverse hole and located within said annular notch in said tool shank.

36. The structure claimed in claim 15 wherein said body portion of said mounting means has a pair of parallel holes, a portion of each of which intersect said shank receiving perforation on opposite sides of said shank receiving perforation, said cutting tool shank having an annular notch near said end having said abutment surface, said retaining means comprising a U-shaped member with parallel legs, said parallel legs each extending in one of said parallel holes and located within said annular notch in said tool shank.

37. The structure claimed in claim 18 wherein said retaining means comprises a peripheral flange on said shank at said end, said flange having an outside diameter greater than said diameter of said sleeve perforation and less than the diameter of said socket member perforation.

38. The structure claimed in claim 18 wherein said shank has an annular notch, said retaining means comprising a resilient split ring captively retained in said notch, said shank being freely rotatable within said split ring, said ring adapted to frictionally engage said sleeve.

39. The structure claimed in claim 18 wherein said shank has a transverse hole near said abutment end of said shank and in that portion of said shank which extends beyond said rearward surface of said mounting means body, said retaining means comprising a removable pin located in said transverse hole, one end at least of said pin extending outside said transverse hole by a distance sufficient to prevent removal of said shank from said perforation in said sleeve.

40. The structure claimed in claim 18 wherein said shank has an annular groove near said abutment end thereof, said retaining means comprising a ring retained in said groove, said ring having an outside diameter greater than the diameter of said shank, said ring lying between said abutment means and said rearward surface of said mounting means body when said shank is in its fully seated position.

41. The structure claimed in claim 24 wherein said base portion of said abutment means has a hole coaxial with said shank receiving perforation, said retaining means comprising an extension perpendicular to and located centrally of said abutment surface on said shank, said extension adapted to extend through and beyond said hole in said base portion, said extension being freely rotatable in said last mentioned hole, removable means in association with that portion of said extension extending beyond said last mentioned hole to prevent withdrawal of said extension from said last mentioned hole.

42. The structure claimed in claim 24 wherein said base portion of said abutment means has a hole coaxial with said shank receiving perforation, said retaining means comprising an extension perpendicular to and located centrally of said abutment surface on said shank, the end of said extension being bifurcated, said bifurcations being resilient and being capable of assuming an expanded position and a contracted position, said extension adapted to extend through said last mentioned hole with said bifurcated end extending beyond said last mentioned hole, said extension being freely rotatable within said last mentioned hole, said bifurcated end capable of passing through said last mentioned hole when in said contracted position and capable of preventing withdrawal of said extension from said last mentioned hole when in said expanded position.

43. The structure claimed in claim 29 wherein said tool shank has an annular notch in the rear portion thereof, said tool shank retaining means comprising a lug on said socket member extending within said annular notch on said tool shank.

44. The structure claimed in claim 29 wherein said retaining means for said tool shank comprises a peripheral flange on said shank at its end, said flange having an outside diameter greater than the diameter of said shank receiving perforation.

45. The structure claimed in claim 31 wherein said ring is an O-ring of resilient material, said shank receiving perforation having an annular radiused portion at its opening in said rearward surface of said body, said radiused portion adapted to receive a portion at least of said O-ring and to prevent the radial expansion of said O-ring when said shank is pulled away from said abutment surface.

46. The structure claimed in claim 31 wherein said ring is a split metallic ring, said shank receiving perforation having an annular radiused portion at its opening in said rearward surface of said body, said radiused portion adapted to receive a portion at least of said split ring and to prevent the radial expansion thereof when said shank is pulled away from said abutment surface.

47. The structure claimed in claim 40 wherein said sleeve perforation has an annular radiused portion at its rearward end, said radiused portion adapted to receive a portion at least of said ring and to prevent the radial expansion of said ring when said shank is pulled away from said abutment surface.

48. The structure claimed in claim 47 wherein said ring is an O-ring of resilient material.

49. The structure claimed in claim 47 wherein said ring is a split metal ring.

50. A rotatable cutting tool for use with a mounting means on a mining machine and the like, said cutting tool comprising an elongated shank portion and an integral nose portion, said shank and said nose portion having a common axis, said nose portion having a longitudinal taper, the cross section of said nose diminishing along said axis in a direction away from the juncture of said nose and shank portions, said shank having a circular cross section, said shank terminating at one end of said juncture of said shank and said nose portion and terminating at its other end in an abutment surface, the diameter of said shank portion comprising the maximum dimension of said tool transverse its long axis.

51. The structure of claim 50 wherein said nose portion is adapted to removably engage a conical cutter bit means.

52. The structure claimed in claim 50 wherein said cutting tool is free of stress-raising changes in diameter.

53. The structure claimed in claim 50 including a hard cutting tip affixed to said nose portion.

54. A rotatable cutting tool for use with a mounting means on a mining machine and the like, said cutting tool having an elongated shank to be received in a perforation in said mounting means, said cutting tool having a cutting means at one end and a gauge-determining abutment surface at the other end, said shank having a circular cross section, said shank having an annular groove near said abutment end, the diameter of said shank portion comprising the maximum dimension of said tool transverse its long axis.

55. The structure claimed in claim 54 wherein said shank between said annular groove and said cutting means is of constant diameter.

56. A cutting tool for use with a mounting means on a mining machine and the like, said mounting means being of the type having a shank receiving perforation and an abutment surface in association with the rearward end of said perforation, said cutting tool being rotatable about its long axis, said cutting tool having an elongated portion adapted to be rotatively held in said perforation in said mounting means, said elongated portion having a circular cross section, cutting means at one end of said tool and an abutment surface at the other end of said tool, said last mentioned abutment surface adapted to cooperate with said mounting means abutment surface, the diameter of said elongated portion comprising the maximum dimension of said tool transverse its long axis.

57. The structure claimed in claim 56 including means on said tool for retaining said tool in said perforation.

References Cited

UNITED STATES PATENTS

| 942,412 | 12/1909 | Rich | 172—713 X |
|---|---|---|---|
| 1,747,908 | 2/1930 | Seifert | 175—354 X |
| 1,790,613 | 1/1931 | Gildersleeve et al. | 175—354 X |
| 1,903,772 | 4/1933 | Bowman | 299—86 X |
| 3,268,260 | 8/1966 | Snipe | 299—91 |

FOREIGN PATENTS

| 1,923,922 | 5/1965 | Germany. |
|---|---|---|

ERNEST R. PURSER, *Primary Examiner.*

UNITED STATES PATENT OFFICE
CERTIFICATE OF CORRECTION

Patent No. 3,397,012                            August 13, 1968

Claude B. Krekeler

It is certified that error appears in the above identified patent and that said Letters Patent are hereby corrected as shown below:

Column 28, line 53, "of" should read -- at --.

Signed and sealed this 24th day of February 1970.

(SEAL)
Attest:

rard M. Fletcher, Jr.
esting Officer

WILLIAM E. SCHUYLER, JR.
Commissioner of Patents